United States Patent [19]

Karlyn et al.

[11] Patent Number: 5,335,594
[45] Date of Patent: Aug. 9, 1994

[54] MULTICOLOR PRINTING SYSTEM FOR THE SILK-SCREEN PRINTING OF COMPACT DISCS

[76] Inventors: William M. Karlyn, 602 Chestnut St., Lynnfield, Mass. 01940; Frederick C. Pink, 14 Mile Stretch Rd., Biddeford Pool, Me. 04006; William L. Lamarre, 119 Water St., Unit 63, Beverly, Mass. 01915; Edward J. Berry, 157 Newton St., Revere, Mass. 02151

[21] Appl. No.: 957,158

[22] Filed: Oct. 7, 1992

Related U.S. Application Data

[62] Division of Ser. No. 665,242, Mar. 6, 1991, Pat. No. 5,165,340.

[51] Int. Cl.⁵ ............................................. B41F 17/00
[52] U.S. Cl. ......................................... 101/35; 101/115; 101/126; 101/129; 101/DIG. 36
[58] Field of Search ....................... 101/35-37, 101/41-44, 114, 115, 124, 126, 129, 474, 476, 481, 485, 486, DIG. 36; 33/614, 617-621

[56] References Cited

U.S. PATENT DOCUMENTS

| | | | |
|---|---|---|---|
| 2,438,639 | 3/1948 | Lawrence | 101/126 |
| 2,613,595 | 10/1952 | Weldon | 101/115 |
| 4,210,077 | 7/1980 | Lindström | 101/126 |
| 4,463,673 | 8/1984 | Moore | 101/129 |
| 4,700,488 | 10/1987 | Curti | 33/614 |
| 4,808,291 | 2/1989 | Denton et al. | 414/222 |
| 4,938,858 | 7/1990 | Zejda | 414/217 |
| 4,969,790 | 11/1990 | Petz et al. | 414/217 |
| 5,092,239 | 3/1992 | Bubley | 101/115 |

FOREIGN PATENT DOCUMENTS

| | | | |
|---|---|---|---|
| 2068836 | 8/1981 | United Kingdom | 101/126 |
| 2212105 | 7/1989 | United Kingdom | 101/115 |

Primary Examiner—Edgar S. Burr
Assistant Examiner—Stephen R. Funk
Attorney, Agent, or Firm—Herbert L. Gatewood

[57] ABSTRACT

Apparatus is provided for automatic transport of compact discs one-at-a-time from a loading station in a horizontally disposed, circular defined path through various work stations e.g., silk-screen printing and UV-curing, to an off-loading station. The compact discs are automatically loaded by loading apparatus onto the transport apparatus one-at-a-time in a predetermined location from apparatus automatically supplying compact discs to the loading apparatus for loading onto the transport apparatus in a plurality of vertically disposed stacks, each stack providing a plurality of discs horizontally disposed and superposed one above the other. Subsequent to printing and curing of the printing ink, the printed compact discs are off-loaded from the annular-shaped transport apparatus one-at-a-time by unloading apparatus and provided in a plurality of vertically disposed stacks of compact discs, each stack containing a plurality of horizontally disposed printed discs superposed one above the other.

8 Claims, 13 Drawing Sheets

MULTICOLOR PRINTING SYSTEM FOR THE SILK-SCREEN PRINTING OF COMPACT DISCS

CROSS-REFERENCE TO RELATED APPLICATIONS

This application is a division of application Ser. No. 07/665,242, filed Mar. 6, 1991, now U.S. Pat. No. 5,165,340.

BACKGROUND OF THE INVENTION

1. Field of the Invention

This invention relates, in general, to a system useful in the silk-screen printing of relatively small, flat objects such as compact discs and floppy disks for computers. More particularly, it relates to a silk-screen printing system comprising in combination apparatus means for the automatic transport of compact discs in stepwise fashion, one-at-a-time, in a horizontally disposed circular-defined path, and the silk-screen printing of such compact discs, means for automatic loading of compact discs onto the transport apparatus one-at-a-time from a vertically disposed stack of a plurality of such discs superposed one above the other in horizontal fashion and for off-loading printed discs from the transport apparatus one disc at-a-time, and providing them in a vertically disposed stack of a plurality of horizontally disposed printed discs superposed one above the other, and apparatus means for supplying and receiving such compact discs in a plurality of vertically disposed stacks. Even more particularly, the invention relates to the specific transport means, load/off-loading means and supplying/receiving means used in the system combination.

2. Description of the Prior Art

Heretofore, others have invented apparatus for the silk-screen printing of compact discs with three colors. One such apparatus of which applicants are aware, and which has been used now for sometime, comprises, in general, a horizontally disposed, annular-shaped, rotatable member onto which compact discs are loaded one-at-a-time in a certain predetermined time sequence and transported from a loading to an unloading station through the various work stations. As the transport member rotates, the discs are transported from the loading station to the various printing stations, at which stations the top planar surfaces of the horizontally disposed compact discs are each printed one-at-a-time with the color of the desired information. Following printing, the rotatable member transports the printed discs to a curing station whereat the printing ink is cured in conventional fashion by, e.g., an ultraviolet (UV) curing means. Subsequently, the discs are unloaded from the rotatable member for further handling, as desired.

Although this known compact disc printing system does the job for which it is intended, i.e., prints compact discs with 3-colors each having the desired information, its use is accompanied, nevertheless, with certain problems or disadvantages. Of critical concern is the location of the silk-screen printing apparatus relative to the annular-shaped rotatable transport member.

The silk-screen printing apparatus in this known device is supported on support means located outside the outer perimeter of the annular-shaped, rotable transport member. During printing of each of the compact discs, the silk-screen squeegee and flood bar moves radially inwardly across the disc and rotatable transport member and then radially outwardly, retracting to its initial rest position outside the outer perimeter. The transport member, in this known apparatus, is fixedly secured at its inner periphery, to a circular-shaped support member. Thus, as the support member is rotated, the transport member rotates. In essence, the annular-shaped transport member and circular-shaped support member constitute one rather large diameter rotatable member having only a relatively small diameter center opening. As a result, the space occupied by the circular-shaped support member is not only underutilized, but wasted as well. Moreover, as the silk-screen printing apparatus in this known device is located outside the perimeter of the rotatable compact disc transport member, the printing system occupies and takes up considerable floor space that may not be readily available for such an installation or is otherwise needed. Perhaps, more importantly, however, the location of the printing apparatus in the system now being used presents considerable difficulty to the operator in set-up and changeover of the printing apparatus for the printing of various different compact discs. This is due to the fact that the silk-screen printing apparatus is so located relative to the annular-shaped transport member that it faces inwardly toward the center of the apparatus. Thus, the operator, necessarily must bend over the rotatable transport member in a somewhat contorted manner to accomplish change over or other tasks associated with the printing apparatus.

Furthermore, in this known compact disc printing system, the compact discs, in general, are loaded and off-loaded onto and from the transport member by means that are relatively complex involving numerous interworking components in combination. This apparatus, like the transport means, occupies considerable floor area that needs to be better utilized.

Subsequent to loading, the compact discs are each more precisely registered on the transport member prior to being transported to the first of the three printing stations. This is accomplished, in general, by a centering pin apparatus located vertically above the transport member. Thus, in general, the centering pin is caused to intrude into the center opening of the compact disc from the top surface thereof causing the compact disc to move somewhat, even though a relatively small distance, across and in contact with the surface of the disc fixture located on the transport member. This is highly undesirable, however, as the surface in contact with the fixture is the bottom surface of the disc on which the recording is provided. This results in occasional marring of the disc recording surface, leading to a disc that may be entirely unsuitable for sale.

Thus, there is need for a printing system for compact discs that not only automates the entire process, but, also, takes up less floor space. Further, there is need for such a printing system wherein the relative locations of the disc transport apparatus and printing apparatus are such as to also facilitate set up and change over or other tasks that need be accomplished on the silk-screen printing apparatus. And, there is needed a means for centering of a compact disc on the transport member prior to printing the disc that results in no, or at least less, marring or otherwise adversely affecting the disc.

SUMMARY OF THE INVENTION

The present invention has as one object the realization of a system for the silk-screen printing of compact discs not attendant with the disadvantages or problems now found in the use of such apparatus.

A further object of the invention is to provide a system for the multicolor printing of compact discs wherein the system, in general, comprises a horizontally disposed, rotatable, annular-shaped disc transport member in combination with silk-screen printing apparatus supported on an annular-shaped fixed support table located within the outer perimeter of such a member, and in overlapping relationship.

Another object of the invention is to provide such a printing system having apparatus in combination with an annular-shaped transport member for the automatic loading of compact discs one-at-a-time onto the transport member and for automatically off-loading of printed compact discs one-at-a-time from the transport member.

Still another object of the invention is to provide a system having apparatus in combination with the loading/off-loading apparatus of the invention for the automatic feeding and supplying of compact discs to the loading mechanism of the loading/off-loading apparatus, the compact discs being provided in a plurality of vertically disposed upright stacks each comprising a plurality of compact discs each horizontally disposed and superposed one above the other.

A still further object of the invention is to provide a system having apparatus in combination with the off-loading mechanism of the loading/off-loading apparatus for receiving printed compact discs one-at-a-time from the transport member and providing such in a plurality of vertically upright stacks, each comprising a plurality of printed compact discs superposed one above the other in horizontal disposition.

A still further object of the invention is to provide apparatus for the registration and centering of each compact disc on a disc fixture in combination with and located on the underside of the transport member comprising a retractable centering pin which intrudes into the disc center hole from the bottom surface of the compact disc, providing improved load accuracy and elimination of marring caused by centering the disc after being placed on the disc fixture.

A key advantage of the printing system disclosed herein is that the silk-screen printing apparatus is so oriented relative to the annular-shaped transport apparatus that the printing screen of the silk-screen printing apparatus faces outwardly from the center of the transport member, rather than inwardly toward the center. As a result, in general, the silk-screen squeegee strokes radially inwardly over the compact disc and annular-shaped transport member and then retracts outwardly to its rest position. Thus, the operator can more readily, and with considerably more ease, set-up the silk-screen printing apparatus and changeover that apparatus for the printing of various different compact discs or other small flat objects, as needed.

A further advantage in the silk-screening printing apparatus being located, relative to the rotatable transport member, in the manner of the invention disclosed herein, is that a safer environment is provided for the operator.

Another advantage is that the printing system of this invention is relatively compact in design compared to known multiprinting systems for compact discs. Thus, quite advantageously, the transport apparatus and work stations of the printing system of this invention not only take up and occupy a somewhat smaller amount of floor space than presently known apparatus, a critical consideration in many installations, or potential installations for such printing apparatus, but such apparatus makes better use of available floor space.

Another advantage of the printing system disclosed in this application is that compact discs can each be centered independently from one another and without marring of the recording surface.

Still another advantage of the invention is that the loading/off-loading apparatus not only combines the loading and unloading mechanisms in one unitary apparatus but such apparatus, most importantly, does not gate printer speed, providing improved operating speed and efficiency. It, moreover, provides improved loading and off-loading accuracy.

Another important advantage of the printing system disclosed herein is that such provides means for automatically feeding or providing a supply of a plurality of compact discs to a loading apparatus one-at-a-time and for automatically off-loading of printed compact discs from the transport member and such compact discs are provided in a plurality of vertically disposed stacks of a plurality of horizontally disposed compact discs.

A further advantage is that vacuum supplied to a disc fixture can be closed off in the event a compact disc is not loaded on the fixture resulting in more efficient use of vacuum and providing a greater force on compact discs that are located on the transport member.

A still further advantage of the invention is that a silk-screen printing system is provided comprising, in combination, apparatus that is of relatively simple construction and operation, compared to such systems now known.

BRIEF DESCRIPTION OF THE DRAWINGS

For a better understanding of the present invention, reference should be had to the following detailed description of the preferred embodiments of the invention which is to be read in conjunction with the accompanying drawings, in which.

DETAILED DESCRIPTION OF THE INVENTION AND THE PREFERRED EMBODIMENTS THEREOF

While the present invention will be described hereinafter with particular reference to the accompanying drawings, it is to be understood at the outset that it is contemplated that the present invention may be varied in specific detail from that illustrated and described herein while still achieving the desirable characteristics and features of the present invention. Accordingly, the description which follows is intended to be understood as a broad enabling disclosure directed to persons skilled in the applicable arts, and is not to be understood as being restrictive.

Figure 1:
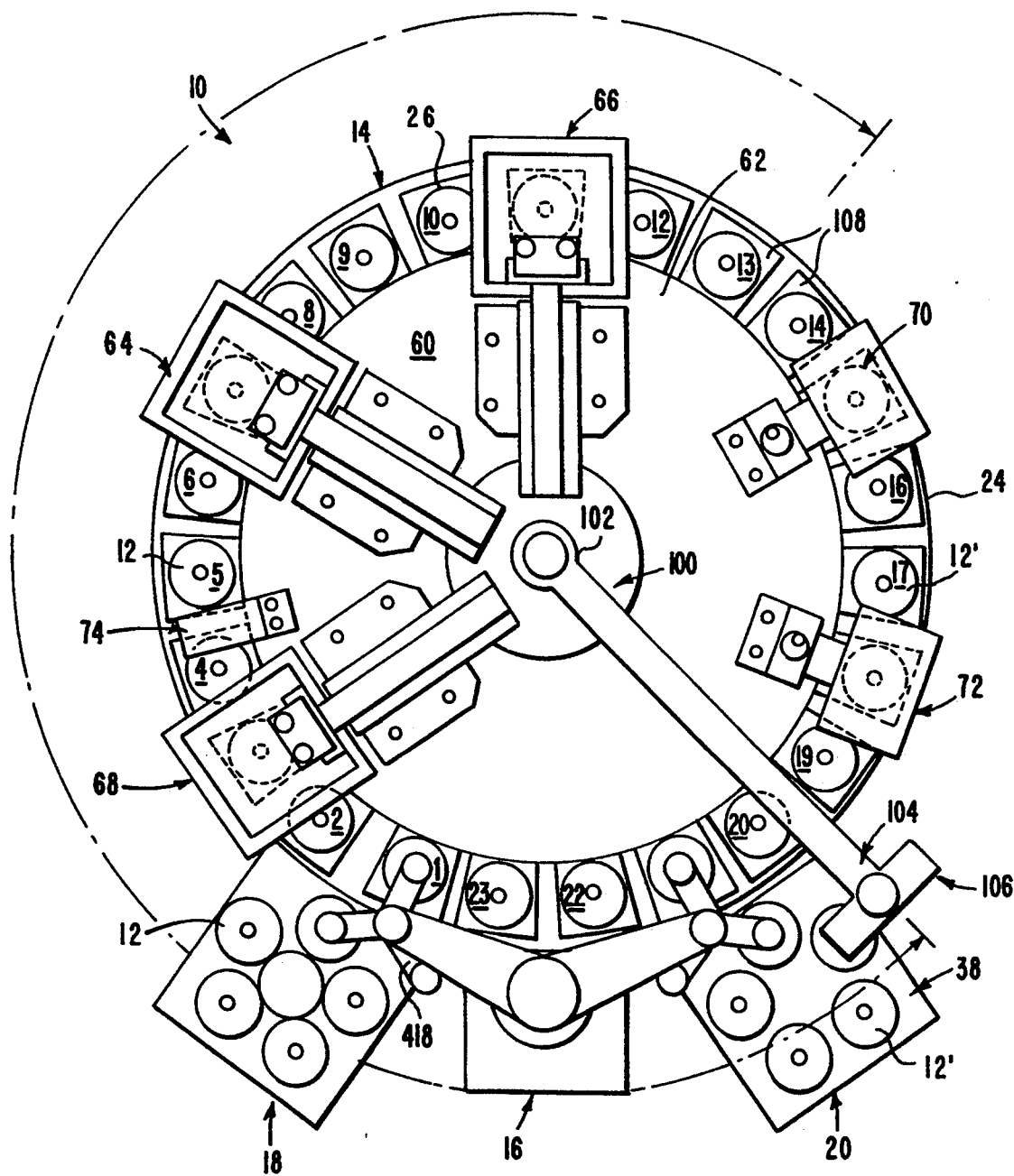
FIG. 1 is a top plan schematic view of a system for the silk-screen printing of compact discs according to the general aspects of the invention showing in operative combination the automatic annular-shaped rotatable transport apparatus whereby compact discs are transported thereon in predetermined spaced-apart locations to and through various work stations in a circular-defined path, the automatic loading/unloading apparatus, and the automatic disc supply/receiver apparatus.

Referring now to FIG. 1 of the drawing, there is shown therein a system 10 according to the invention for the 3-color silk-screen printing of flat objects such as compact discs 12 comprising in combination, a horizontally disposed annular-shaped, rotable transport member ( or dial ) 14, loading/off-loading apparatus generally referred to by reference numeral 16, and compact disc sending (or feeding) and receiving apparatus 18, 20.

Figure 2:
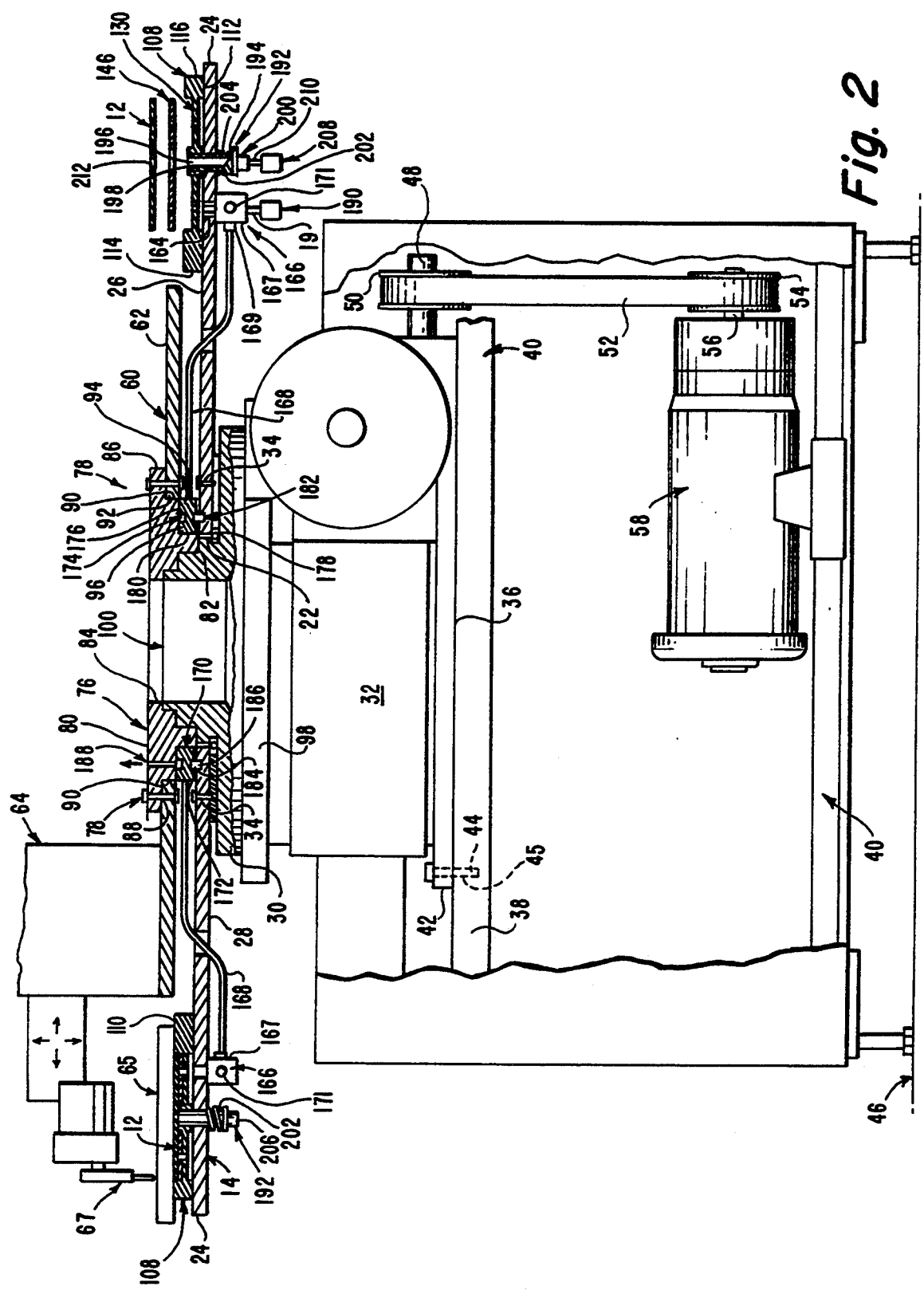
FIG. 2 is a view in cross-section on a diameter of the annular-shaped transport apparatus showing the mounting of a silk-screen printer in a manner according to one aspect of the invention relative to the annular-shaped transport member for the compact discs, the annular-shaped transport member, the means for indexing the transport member, a compact disc fixture, the means for supplying vacuum to each of the compact disc fixtures located on the top surface of the transport member, the centering means for a compact disc, and the linkage connecting the indexing means for the transport apparatus to the main drive motor.

As best shown in FIG. 2, the annular-shaped transport member or dial 14 is defined by inner and outer, vertically disposed, parallel, peripheral edges 22, 24 defined by predetermined inner and outer diameters, and top and bottom, parallel, planar, horizontally disposed surfaces 26, 28. The dial 14 is fixedly connected in conventional manner to the rotary head 30 of indexer 32 adjacent its inner peripheral edge 22 by means of bolts identified generally by reference numeral 34. The indexer 32 is defined by a bottom, horizontally disposed planar surface 36 which rests upon and is fixedly connected to and supported by the horizontally disposed platform 38 of frame 40. This is accomplished by usual techniques, e.g. by means of bolts 42 which extend through flanges identified by reference numeral 44 into threaded dead bores 45 provided in platform 38. The frame 40 is supported by the concrete floor 46. If desired, it can be fixedly connected in usual fashion to the floor.

The indexer 32 can be any commercially available indexer provided such is capable of rotating the dial 14 and indexing it at every third location in the circular-defined path as hereinafter more fully described. A standard index drive such as the "Model ED 810" available commercially from Ferguson Machine Co., St. Louis, Mo. will be found suitable in the practice of the invention disclosed herein. Such indexing apparatus, in general, comprises a globoidal cam whereby perpendicular input and output shafts can be driven in synchronous manner, as desired. This indexing apparatus is provided in combination with an appropriate reducer for providing the desired torque on the motor driven input shaft 48.

Still referring to FIG. 2, it will be seen that, in this configuration of the invention, the input shaft 48 extends outwardly from the indexer 32 adjacent the bottom thereof. On this horizontally disposed shaft there is provided a pulley 50 in operative association with drive belt 52. This drive belt rides around pulley 54 provided on drive shaft 56 in usual fashion. The drive shaft 56 is powered by a conventional electric motor 58 fixedly connected according to usual technique to the frame 40. The drive shafts 48 and 56, as shown in FIG. 2, are horizontally disposed and parallel to one another. Various motors can be used in the practice of the invention provided such are capable of driving the indexer 32 and dial 14 at the desired production rates. Such will depend to some extent upon, among other considerations, the diameter of the annular-shaped transport member, the torque requirements, operatively associated apparatus, etc. A suitable motor can readily be selected by those skilled in the art. One form of motor which has provided satisfactory results in the practice of the invention is available from Leeson. Such motor is characterized as a permanent magnet D.C., 2 hp. motor, capable of 2500 rpm top speed.

The transport member or dial 14 can be any size desired. Nevertheless, the larger the diameter, the greater will be the space in the working area taken up. A 60" diameter dial has proven quite satisfactory in the practice of the invention and results in a compact printing system taking up a relatively small area of floor space. In general, the indexer 32 should be capable of operating at a nominal speed of about 7.8 rpm. At such an operating rate, the printing system 10, hereinafter more fully disclosed, will be capable of producing about 60 printed compact discs 12 per minute. The indexer used is characterized by a torque capability of 20,000 inch-lbs, a dwell index ratio of 180 degrees, and an accuracy of plus or minus 1.5 mils.

The transport member 14 is located in a horizontal plane just below that defined by a stationary, horizontally disposed, annular-shaped table or support member 60 on the top surface 62 of which is located silk-screen printing apparatus identified generally by reference numerals 64, 66, and 68. The printing apparatuses are provided in predetermined, spaced-apart locations as hereinafter made more clear. Downstream from the printing apparatus, as shown in FIG. 1, there are provided curing stations, at which locations there are located conventional UV curing apparatus 70, 72. Various such apparatus are available and can readily be selected by one skilled in the art, knowing the curing characteristics of the particular printing inks to be used. Curing apparatus 72 is optional and may not always be used. Such apparatus serves as a back-up curing means where longer curing times may be necessary for the curing of a particular ink. Upstream from printing apparatus 64 there is located a conventional cleaning station 74, the purpose for which is to make certain the disc surface to be printed is free of dust, etc. prior to application of the printing ink. Thus, the top surface of each disc can be subjected to a blast of ionized air to dissipate any charged on the dust particles and afterwards vacuumed to pick-up and, remove any dust particles, etc. on the compact disc surface to be printed.

The fixed support table 60 is fixedly connected to, and maintained in horizontal disposition above and parallel to the dial 14 by the annular-shaped, centrally disposed fixed body member 76. This can be accomplished according to usual techniques by means of bolts referred to generally by reference numeral 78, which pass through openings provided in the two members. The body member 76 is defined by top and bottom, planar, parallel, horizontally disposed surfaces 80, 82 and by inner and outer vertically upright peripheral surfaces or edges 84, 86 parallel, respectively, to peripheral edges 22, 24. The top surfaces 26, 62, and 80 of the dial and fixed members are in planes parallel to one another.

The fixed body member 76, as will be readily seen in FIG. 2, is defined by two overhangs extending inwardly from the outer peripheral edge 86. The first, or upper overhang is defined by horizontally disposed planar bottom surface 88 and vertically upright circular-shaped edge 90. Thus, this overhang overlays the inner peripheral edge 92 of the fixed support table 60, allowing for fixedly connecting the two members together by bolts 78, earlier-mentioned. The second, or lower, overhang is defined by the annular-shaped horizontally disposed surface 94 and vertically disposed surface, or peripheral edge 96, the latter surface being parallel to peripheral edges 84, 86, and 92. The purpose for this last-mentioned overhang will soon be made more clear.

The annular-shaped body member 76 is fixedly connected to the fixed portion 98 of the indexer 32 by conventional means (not shown). Provided in the fixed body portion 98 is a centrally located vertically disposed cylindrical-shaped opening 100 in which is located (FIG. 1) a vertically disposed tubular-shaped member 102 at the top end of which is rotatably connected a horizontally disposed tubular-shaped arm 104. Thus, there is provided means for enclosing all electrical wiring connected between various operating mechanisms and control station 106. The control station 106 can be rotated by the operator, as will be appreciated, to any work station or the like within the 270 degree arc, as shown by the arrows in FIG. 1 between the loading station and the stations just prior to the curing means 70. This enables the operator to control the operation of the system at any point desired in this arc by merely rotating the control arm 104 to the desired location around the transport member 14. The control system and station 106 can be customized with any control buttons or the like desired not only to start/stop the printing system but to index the transport member, provide the loading mechanism on/off, etc. as desired. The providing of any and all functional controls needed, or desired, in the practice of the invention, is all within the skill of the art.

It will be appreciated by those skilled in the art that fixed body member 76 can be machined out of a suitable piece of metal. Nevertheless, this body member can comprise, if desired, three annular-shaped planar members of predetermined diameters fixedly connected together in horizontal disposition so as to provide the two overhangs earlier described. Also, if desired, the support table 60 and fixed body member 76 need not be two separate members. The two members can be provided as one member, if desired, allowing the support table 60 and fixed body member 76 to be in the same horizontal plane. In such a case, however, the lower overhang defined by surfaces 94, 96 will still be necessary, as later more fully appreciated. The important consideration is that a fixed support be provided for the silk-screen printing apparatus whereby such apparatus can be located substantially, preferably completely, within the outer peripheral edge 24 of the rotating dial 14, and facing outwardly toward that edge, as shown in FIG. 2, rather than toward the center of the dial. It will be appreciated also that the support platform 76 for the silk-screen printers is not only superposed above the annular-shaped transport member, but that such platform overlaps the inner portion of the transport member to a large extent. Thus, there is provided, in accordance with one aspect of the invention, a silk-screen printing system of relatively compact design and one offering more ready set up and easy changeover by the operator in the printing of different compact discs.

Figure 4:
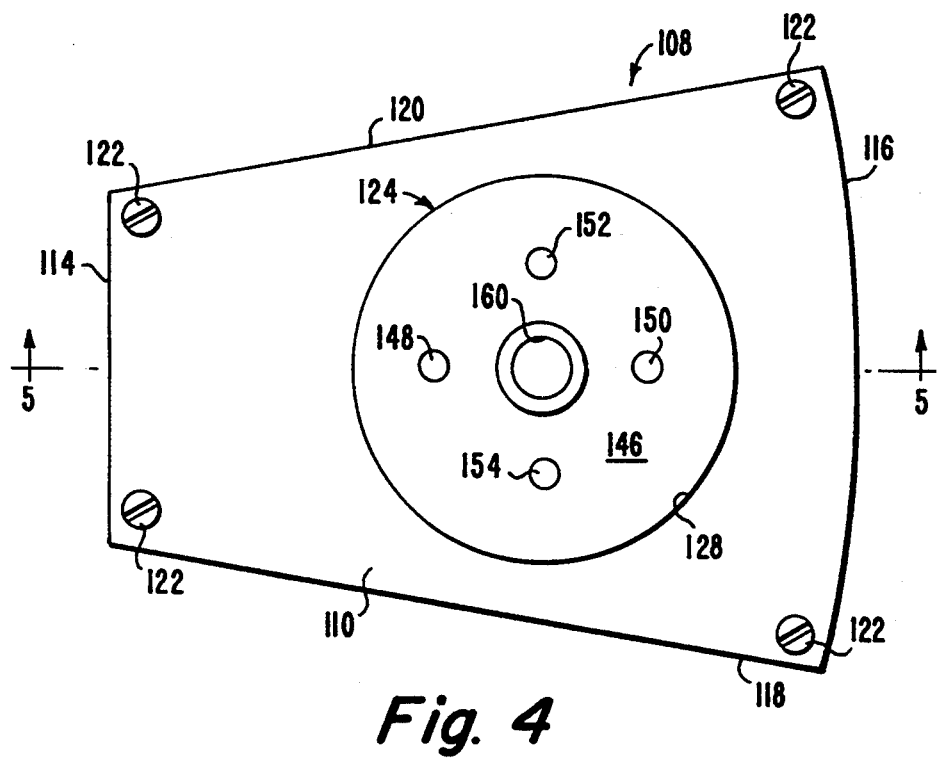
FIG. 4 is a top plan view of one of the compact disc fixtures provided on the top planar surface of the transport member without a compact disc being located therein.

The circular-defined path traveled by the annular-shaped dial 14, as best shown in FIG. 1, is divided, in the practice of the invention, into 23 equally spaced-apart fixed locations or stations, indicated in the drawing (FIG. 1) by reference numerals 1–23 appearing on the top surface 26 of the rotatable member. It will be appreciated that such locations are actually separate and distinct from, though defined by, the rotatable member 14 and identify the precise locations for indexing of the rotatable 25 member or dial 14 during the printing operation, as later more fully described. A like number of locations are also provided on the dial. These locations are each provided inwardly the same radial distance from the outer peripheral edge defined by peripheral edge 24 of the dial and are located at points on an imaginary circle defined by the inwardly disposed locations. These locations are further defined by radii equally spaced about and intersecting with the imaginary circle. These intersections define, and this is a critical aspect of this invention, the precise location of the center point of the circular-shaped well 124 provided in the compact disc fixtures 108 provided at each location on the dial hereinafter more fully described. See FIGS. 2 and 4. As shown in FIG. 1, location No.1 is the station at which compact discs 12 are loaded onto the transport member 14, as later described. And, station No. 21 is where the printed compact discs 12 are off-loaded or unloaded from the transport member. These locations coincide with the same numbered locations on the dial when the dial is at rest as shown in the drawing.

The compact disc fixtures 108 (FIGS. 4,5) are, as shown in the drawing, each defined by top and bottom planar, parallel horizontally disposed surfaces 110, 112 and vertically upright inner and outer edges 114, 116 and side edges 118, 120. These fixtures are each supported by and fixedly connected to the top planar surface 26 of the rotable transport member 14, according to usual techniques, by means of threaded fasteners identified generally by reference numerals 122. Each fixture 108 is further defined by a centrally located circular-shaped well 124 provided in the top planar surface 110 which is, in turn, defined by a bottom horizontally disposed planar surface 126 parallel to top planar surface 110, and a vertically upright peripheral edge or surface 128. In the bottom planar surface 112 of the fixture there is provided a well or plenum 130 concentric to well 124 defined by horizontally disposed planar surface 132 parallel to surface 126 and the top surface 26 of the dial and vertically upright circular-shaped edge 134. The two wells are in communication with one another through circular-shaped openings such as indicated by reference numerals 136, 138, provided in the bridge 144 defined by the planar bottom surfaces 126, 132 of the wells 124, 130, the purpose for which will soon be disclosed. Although four such openings are provided, it will be appreciated that a larger number of or fewer openings can be provided, as desired, provided such function to accomplish the purposes hereinafter disclosed. In the well 124, there is provided an annular-shaped disc support member 146 upon which the compact disc 12 is supported for transport through the various work stations. This support member is provided with circular-shaped openings 148, 150, 152, and 154 which extend through the support member from the top, horizontally disposed, planar surface 156 to the bottom surface 158, parallel thereto. A like number of openings will be provided in the disc support member 146 and bridge 144, these openings being concentric with one another whereby the openings in the disc support member communicate with plenum 130.

Figure 5:
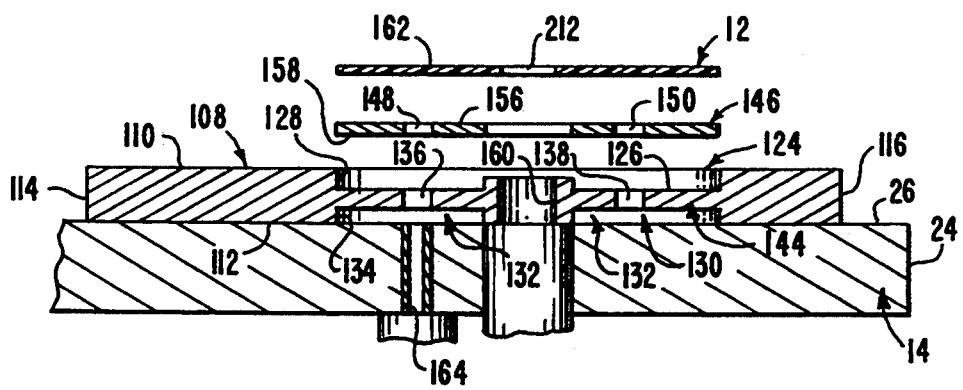
FIG. 5 is an exploded cross-sectional view of the fixture shown in FIG. 4 taken at secant lines 5—5 and showing a compact disc located in the fixture.

Although not specifically shown in FIG. 5, an elongated tubular-shaped sleeve such as indicated by reference numeral 160 of conventional material is provided as commonly done for wear purposes, concentric with the centers of well 124, 130 and in perpendicular disposition thereto. The bottom end of the sleeve, should terminate in the plane defined by the bottom planar surface 112. Importantly, however, the top end of sleeve 160 need terminate in the plane defined by the top surface 156 of disc 146, thus allowing the compact disc 12 to reside in the well 124 and its top planar surface 162 to be in the same horizontal plane as that defined by the top planar surface 110 of the disc fixture 108. This is of extreme importance so that during the silk-screen printing of a compact disc, hereinafter more fully described, the squeegee 67 will engage one continuous surface. The bottom of the silk-screen frame 65 will be so located that it defines a plane parallel to the top surface 110 of the fixture 108 and about ⅛ inch above the surface. Although not shown in the drawings, the silk-screen frame can be supported in conventional manner.

At the location of each disc fixture 108, there is provided a vertically disposed cylindrical-shaped opening in the dial 14 such as indicated by reference numeral 164. This opening provides communication between the plenum 130 and a conventional pneumatic operated two-way valve 166 (FIG. 2) located underneath the dial 14 and fixedly secured thereto according to usual techniques. Connected to the valve 166 is one end of a tubular conduit 168, the other end being connected to the annular-shaped vacuum manifold 170 at its vertically disposed peripheral outer edge 172 and in communication with the annular-shaped groove 174 provided in the horizontally disposed annular-shaped top planar surface 176 thereof. The vacuum manifold 170 is further defined by an annular-shaped bottom surface 178 parallel to the top surface 176 and a vertically disposed planar circular-shaped inner edge 180 parallel to the outer edge 172. Operatively associated with the manifold 170 at its bottom surface 178 and located in predetermined spaced-apart locations in the bottom annular-shaped surface of the manifold are a plurality of elongated coil springs 182, the purpose for which will soon be disclosed. The top end of each of the springs is located in a vertically upright dead bore 184 provided inwardly in the bottom surface of the vacuum manifold, the bottom end being located in a dead bore 186 provided in and perpendicular to the top surface 26 of dial 14 and in direct opposition to bore 184. As will be seen from FIG. 2 the top surface 176 of the manifold and the top surface 94 of the lower overhang are in contact with one another, as are the vertically upright edges 96 and 180. Communicating with the annular-shaped groove 174 is a vertically upright cylindrical-shaped opening 188 provided in the fixed body member 76. Although not shown in the drawings, this opening communicates with the source of vacuum, as indicated by the arrow, a conventional vacuum pump. Thus, vacuum, as hereinafter further disclosed can be provided independently to each of the compact disc fixtures 108 for holding a compact disc 12 securely against the disc support member 146 after registration and while being transported through the various work stations.

As the dial 14 rotates, it will be appreciated that the top surface 176 and inner edge 180 of the vacuum manifold 170 are in sliding contact with the opposed surfaces of the fixed body member 76. A tight seal between the top surface 176 of the manifold and the bottom surface 94 of the fixed body member is provided by the force of the vacuum exerted on the manifold 170. Nevertheless, the compressed coil springs 182 will better ensure manifold 170 is in sealing engagement with bottom surface 94. It will be appreciated that the manifold 170 should, most desirably, be of a material having low friction characteristics such as DELRIN polyacetal resin providing ease in sliding of the manifold surfaces against the fixed member surfaces as the dial 14 rotates. Although not shown in the drawing for sake of clarity, the manifold bottom surface can be operatively connected to the top surface of the dial by pins or the like ensuring the rotation of the manifold. Somewhat less desirable, the vacuum manifold can, in some cases at least, be fixedly secured in conventional manner to the transport member 14.

Operatively associated with the valve 166, as shown in FIG. 2, is a conventional rotary actuator mechanism 190 (fixedly secured to the frame 40—not shown) for automatically opening of the valve at that particular location on the dial when the transport member is indexed to the loading station (location #1) whereby vacuum is applied to the compact disc 12 as loaded. A like actuator is located at the unloading station so that this particular valve can be automatically closed and the printed compact disc 12' indexed to that station can be readily off-loaded from the transport member 14. Those skilled in the art will readily appreciate that various conventional two-way valves and actuating means therefor can be used in the practice of the invention, provided they accomplish the functions described herein. The valve 166 used in the practice of the invention is available commercially from Clippard Instrument Laboratories of Cincinnati, Ohio. The valve used is a conventional 4-way, double acting, stem operated detent valve. The valve comprises, in general, an elongated horizontally disposed body member 167 having an internal piston (not shown) capable of opening and closing off the opening 169 in the valve connected to the vacuum conduit 168. The internally located piston is caused to operate, in general, by elongated horizontally disposed opposed members capable of reciprocal in/out operation, the upstream member being identified generally by reference number 171 provided in the valve body 167 on opposite sides of the piston. The actuator means 190 used in the practice of the invention comprises, in general, a lever 191 capable of rotary movement in a clockwise direction, at the loading station, and counterclockwise at the off-loading station. When activated, the lever 191 pushes in the valve member 171 at the loading station causing the valve 166 to be opened to the vacuum source. At the off-loading station, the rotating lever 191 operates to push in the opposing valve member 173 (not shown) to close off the valve. One form of actuator means which has been found satisfactory is a conventional pneumatic rotary actuator commercially available from SMC Pneumatic Inc. of Indianapolis, Ind.

As will be seen by reference to FIG. 2, a plurality of registering means 192 are provided on the underneath side of the transport member 14 and fixedly connected thereto in conventional manner, in opposition to each disc fixture 108. The registering means 192 comprises, in general, an elongated, tubular-shaped housing 194 extending perpendicularly downwardly from the bottom surface 28 of the transport member 14 in communication with and concentric to the tubular sleeve 160. Located within the housing 194 is an elongated vertically upright circular-shaped registering pin 196 having an exposed rounded end 198, the purpose for which is to register the compact disc 12 as it is being loaded onto the disc fixture 108 and to provide it in the precise location desired for printing just prior to application of vacuum to the fixture. The registering pin 196 is supported at its bottom end on a circular-shaped horizontally disposed annular-shaped base member 200 surrounding the housing 194, having a planar top surface 202 parallel to bottom surface 28 of the dial. The registering pin is maintained in its inoperative or retracted position by elongated spring member 204 which surrounds the tubular-shaped housing 194 the bottom end of which is supported on planar top surface 202 of the annular-shaped base member 200. Operatively associated with the pin registering means at its bottom end 206 is a conventional means 208 (fixedly connected to frame 40) for actuating the operation of the registering means. This actuating means comprises, in general, a conventional two way piston having a vertically upright rod 210 connected thereto and in operative association with base member 200. Thus, as the piston is actuated, on the loading of a compact disc onto the transport member 14, the piston rod 210 rises vertically upwardly causing the base member 200 and the registering pin 196 to be raised vertically upwardly engaging the centerhole 212 of the compact disc as it is being loaded onto the disc fixture and causing such to be precisely centered on the disc support member or pad 146 just prior to application of vacuum. The compact disc is importantly centered prior to being deposited on the disc support member. On the application of the vacuum to the disc fixture, the registering pin 196 is automatically caused to retract by downward expansion of the compressed spring 204. Importantly, however, the pin does not retract until the vacuum is applied to the disc. The pin is retracted so that the rounded end of the pin is below the plane of the fixture's top surface 110 and below the bottom surface of the compact disc. Quite advantageously, a registering means is provided in association with each disc fixture allowing each compact disc to be precisely registered prior to being printed. The registering pin used is of stainless steel and is located within a bronze bushing providing good bearing characteristics, according to conventional technique, such as to provide high tolerance, e.g. approximately 2-3 mils smaller diameter, relative to the center hole of the compact disc.

As earlier disclosed, the number of fixed, spaced-apart locations or stations defined by the circular-defined path of travel of the rotatable dial is 23. This need not necessarily, however, always be the case. The number of fixed stations, hence the number of disc fixtures 108 that need be provided with any particular dial or printing operation, will depend upon a number of factors, as appreciated by those skilled in the art, e.g., the number of colors to be applied to the compact disc, the diameter of the dial, the width of the printer screen, and the width dimensions of apparatus at other work stations such as the UV curing apparatus. As is well known by those skilled in the silk-screen printing art, the width of the printer screen will depend primarily upon the width of the image to be printed. In the practice of this invention, three colors are applied to each compact disc, each color necessitating curing before application of the next color. Thus, in order to provide the most compact printing system, determined largely by the outside diameter of the annular-shaped dial 14, the three different colors to be applied in this embodiment of the invention necessitates that three complete rotations of the dial be made for each compact disc to be printed, one color being applied each rotation, as later more fully disclosed. Each of the first two colors applied need be at least partially cured prior to application of the next color, as those skilled in the silk-screen printing art readily appreciate that wet ink cannot be applied on wet ink. That being the case, an indexer capable of indexing each third location defined by the circular path of travel is necessary. Then, one must, in general, taking into consideration the number of work stations to be provided and their respective width dimensions, determine the number of locations to be provided and the distance between each location. In general, where three colors are to be printed on a compact disc, each in a separate revolution of the transport member, any number of odd numbered stations can be provided as long as such is not divisible by three. As an example, in three color printing as herein disclosed, the minimum number of stations will be determined largely by the number of work stations involved, their width dimensions and the required spacing between each work station. The maximum number of stations for indexing will be largely determined by the desired minimum outer diameter of the dial. The optimum dial diameter, number of fixed stations, etc. can readily be determined by those skilled in the art. It will be appreciated also that in the broader concepts of this invention, such is not limited to three-color printing.

The structure of the rotatable transport member, quite advantageously, allows the silk-screen printing apparatus 64, 66, 68 to each be installed relative thereto so as to provide ready changeover by the operator to other printing operations. Thus, as will be readily appreciated by reference to FIG. 2, the silk-screen frame of each printing apparatus, as indicated generally by reference numeral 65, extends radially outwardly from the center of the rotatable transport member 14 and the fixed support member 60 on which the silk-screen printing apparatus is fixedly mounted. Although not shown in FIG. 2 for sake of clarity, the silk-screen frame is mounted in conventional fashion to the printer apparatus. The silk-screen printer 64, as shown by the drawing, is mounted so that the outer extent of the silk-screen frame 65 lies largely within the outer perimeter of the rotatable transport member. Although not shown in the drawings for such does not affect the basic concepts of this invention, other than as disclosed herein, the frame 65 need be supported at its outer edge. This can readily be accomplished by those in the art. The squeegee 67 as shown by the arrows in the drawing (FIG. 2) moves radially inwardly in a horizontally disposed plane across the compact disc 12 during the printing cycle. As will be readily appreciated this orientation of the silk-screen printer provides not only for easier changeover to other printing operations but also allows for easier set up and other operations by the operator, as well as a safer working environment. The squeegee, moreover, is mounted so that it can be raised vertically upwardly in a clockwise pivoting manner, as desired.

Figures 6, 15:
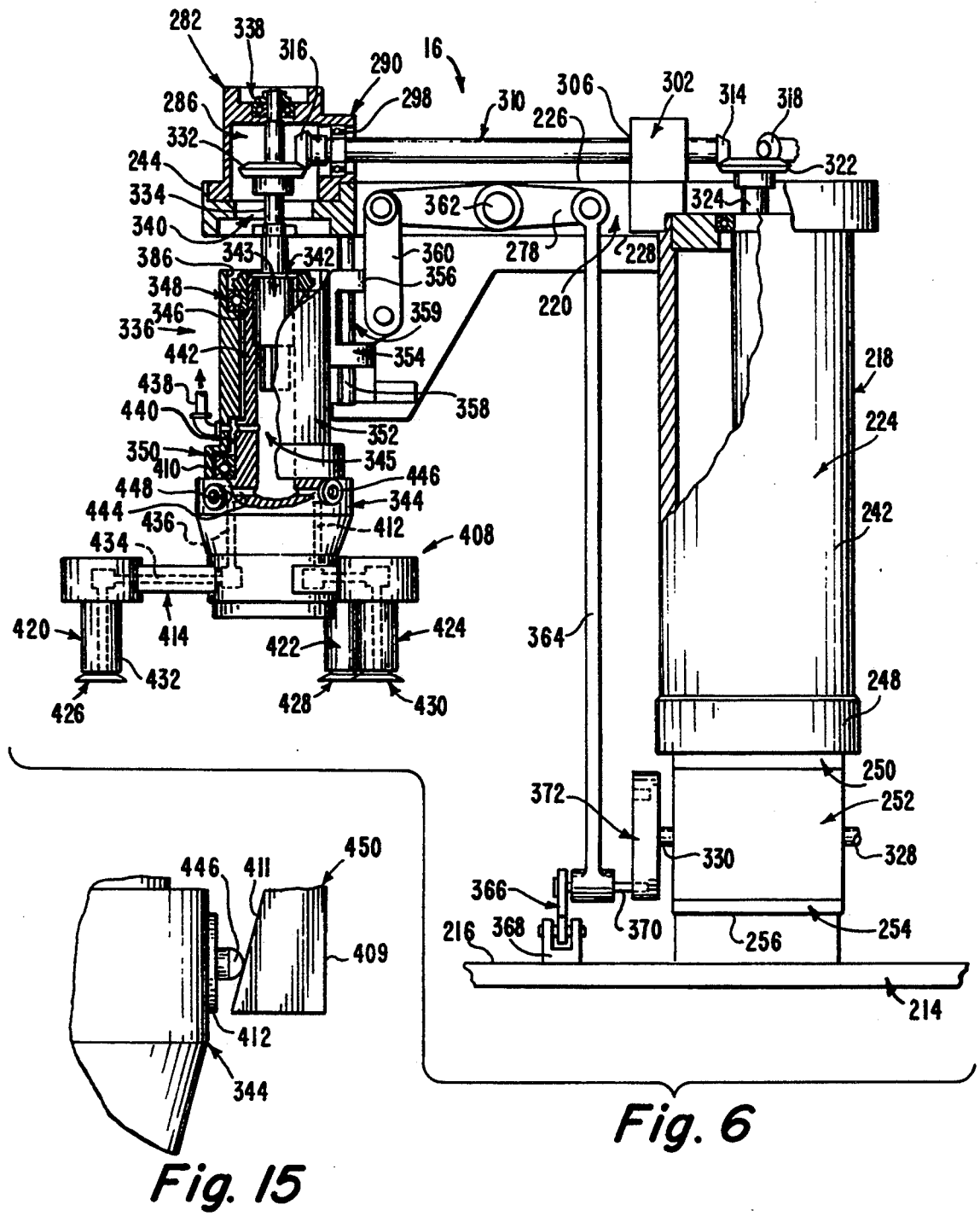
FIG. 6 is a side view in elevation showing in part the loading/off-loading apparatus according to another aspect of the invention, and its mounting on a support platform connected to the frame for the transport apparatus showing the loading mechanism of the loading/off-loading apparatus partially in section and the operating linkage connected to the index means for indexing the sucker arms provided on the loading apparatus.
FIG. 15 is a partial view of the pick and carry unit of the loading mechanism showing means associated therewith for closing off vacuum to the sucker arm located at the load station on the rotatable disc transport member.
Figure 7:
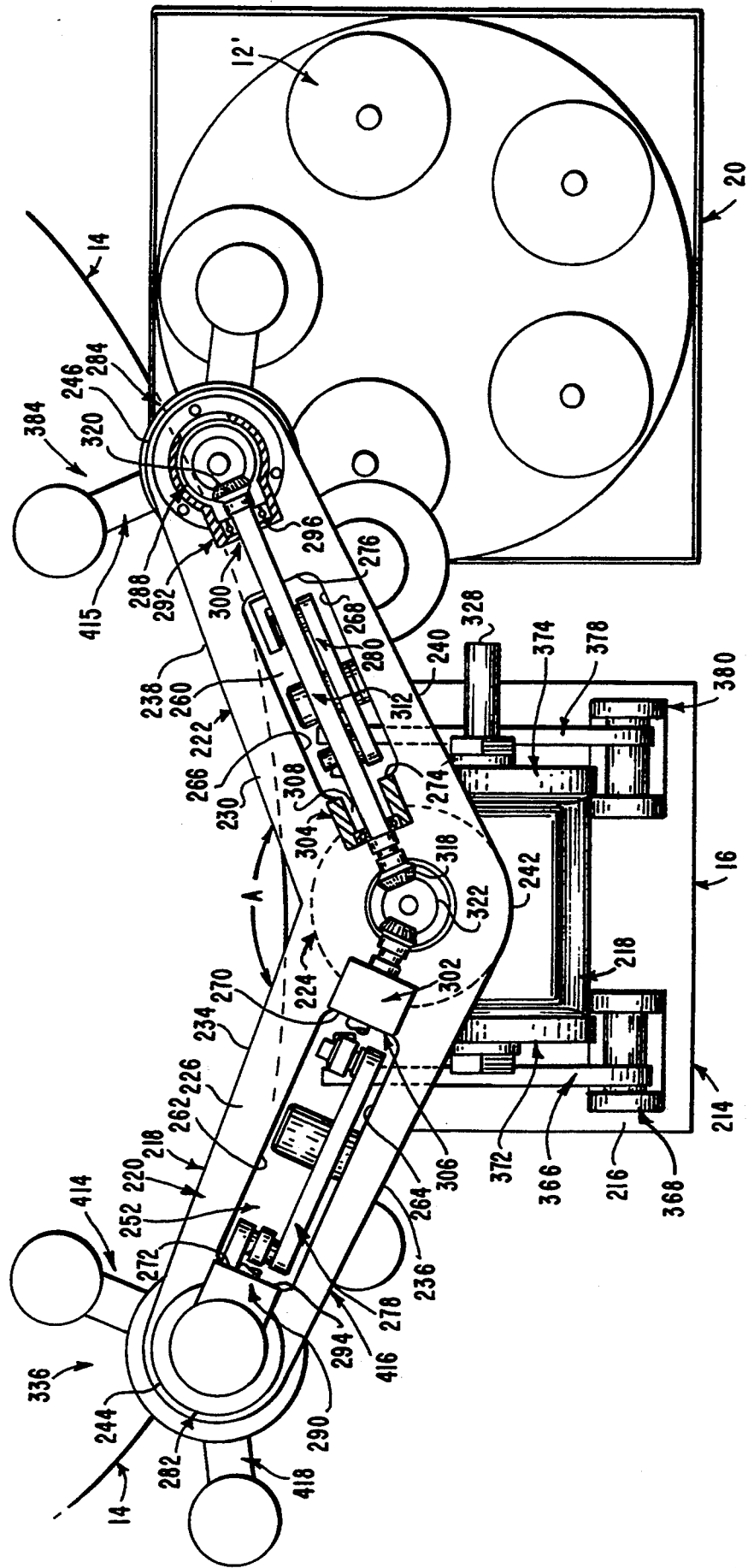
FIG. 7 is a view looking down onto the top surface of the horizontally disposed arms of the loading/off-loading apparatus according to the invention showing the linking mechanism with the drive shaft therefor for operation of the load and off-load mechanisms and the operation of the pick and carry units associated therewith and the top view of the receiver apparatus in operative combination with the off-loading mechanism for receiving printed compact discs from the transport member and providing such in a plurality of vertically disposed stacks each of a plurality of compact discs superposed one above the other on a spindle.

The loading/unloading apparatus 16, as best seen in FIG. 6, is fixedly supported on a horizontally disposed platform 214 fixedly connected to the frame 40 in a conventional manner (not shown). The platform 214 defines a horizontally disposed planar surface 216, parallel to the plane defined by the top surface 26 of the rotatable transport member, for supporting the vertically disposed load/unloading apparatus 16. This apparatus, as may be better appreciated by reference to FIG. 7, comprises a somewhat T-shaped frame 218 comprising a horizontally disposed top member comprising arms 220, 222, of equal length and dimensions and a circular-shaped upright member 224 perpendicular to the cross-bar formed by the arms 220, 222 and depending vertically downwardly therefrom. The upright member 224 intersects the arms of the T at their inner ends and is located equidistantly inwardly from each of the ends, as best seen in FIG. 7. The horizontally disposed arms 220, 222 are defined by upper and lower spaced-apart, parallel planar surfaces 226, 228 and 230, 232, (not shown) respectively, the top surfaces lying in the same horizontal plane, as do the bottom planar surfaces. The arms 220, 222 are further defined by vertically upright inner and outer edges 234, 236, 238, 240, respectively, connecting the top and bottom surfaces of each. The outer edges 236, 240 of the arms taper inwardly toward one another at predetermined equal angles and are joined at their inner ends (FIG. 7) being tangent to and defining the arc of a circle having the radius of the circular-shaped upright member 224. The inner edges 234, 238 of the arms are joined together at their inner ends defining an obtuse angle A bisected by a diameter of the circle defined by the outer peripheral surface 242 of the upright member 224. The arms 220, 222 terminate at their outer ends in vertically upright rounded edges 244, 246 each of which provides a smooth curve defined by a semicircle the ends of which join to the respective outer and inner edges of arms 220, 222. As seen in FIG. 7, the outer and inner edges of each of the arms taper inwardly toward one another from their respective inner ends being tangent to the circle defined by the respective rounded outer edges 244, 246. The angle "A" formed by the inner edges of the arms at their inner ends can vary somewhat, depending at least in part on the diameter of the dial, the spacing between and location of the compact disc fixtures 108 provided on the dial 14, the number of locations to be indexed, the length of the arms 220, 222, as will be appreciated. The optimum angle A and configuration of the loading-/unloading apparatus, in any particular application, is well within the skill of the art.

As shown in FIG. 6, the vertically upright cylindrical-shaped member 224 terminates in a horizontally disposed base member 248 perpendicular thereto. This base member rests upon and is supported by the horizontally disposed planar surfaced top member 250 of the housing 252 for a conventional index drive located therein. The bottom member 254 of the housing is defined by a horizontally disposed planar bottom surface 256, parallel to the upper surface of the top member 250 and to the horizontal plane defined by the upper surfaces of the arms 220, 222. The bottom member 254 is spaced vertically upwardly a predetermined distance from and is fixedly secured according to conventional manner to the platform 214, the horizontally disposed planar surface 216 thereof being parallel to the plane defined by the said upper surfaces of the arms, and to the upper planar surface 26 of the rotatable transport member. This spacing will depend, among other considerations, upon the horizontal location of the platform 214 on the frame 40 to which it is fixedly secured, the distance that the planar top surface 267 of the dial is located above the floor, and the vertical length of the housing upright member 224.

Various indexers can be used for operation of the loading/unloading apparatus, as hereinafter more fully described. The main requirements, in this particular embodiment of the invention, are that such have a dwell index ratio of 180 degrees and that such be three-stop. One form of indexer that will meet the requirements of the invention and which has provided satisfactory results in the practice thereof is available from Emerson Power Transmission Corp., Wheeling, Ill. under the trade designation Camco Custom Cams, RG40.

Turning now again to FIG. 7, it will be seen that the arms 220, 222 are each provided with elongated rectangular-shaped openings 258, 260 defined by vertically upright spaced-apart elongated edges 262, 264 and 266, 268, and vertically upright spaced-apart inner and outer end edges 270, 272 and 274, 276, respectively. Located within the rectangular-shaped openings 258, 260 are elongated arms 278, 280 pivotally mounted in the respective opening at their mid-points for vertical up and down motion, as later more fully described (See FIG. 6). Affixed to the top surface of the arms 220, 222, and located at their respective outer ends are circular-shaped vertically upright housings 282, 284. These housings define, respectively, cylindrical-shaped upright interior cavities closed at the top end thereof and open at the bottom identified by reference numerals 286, 288. Projecting inwardly and integral with the respective housings 282, 284 are mounting appendages 290, 292 defined by vertically upright planar inner surfaces 294, 296. The appendages are provided with horizontally disposed circular-shaped openings 298, 300 extending inwardly from the planar surfaces 294, 296 and communicating, respectively, with the cavities 286, 288. Located inwardly from the inner ends of the arms 220, 222 and fixedly connected to the top surfaces thereof are mounting members 302, 304. These members are provided, respectively, with horizontally disposed, circular-shaped, elongated openings 306, 308 of the same diameter as openings 298, 300. The openings 298, 306 and 300, 308 are in direct opposition to one another, respectively, and in the same horizontal plane, defining imaginary centerlines connecting the center of the circle defined by the outer surface 242 of the vertically upright member 224 and those circles defined by the respective circular shaped housings 282, 284 and outer end edges 244, 246.

Figure 3:
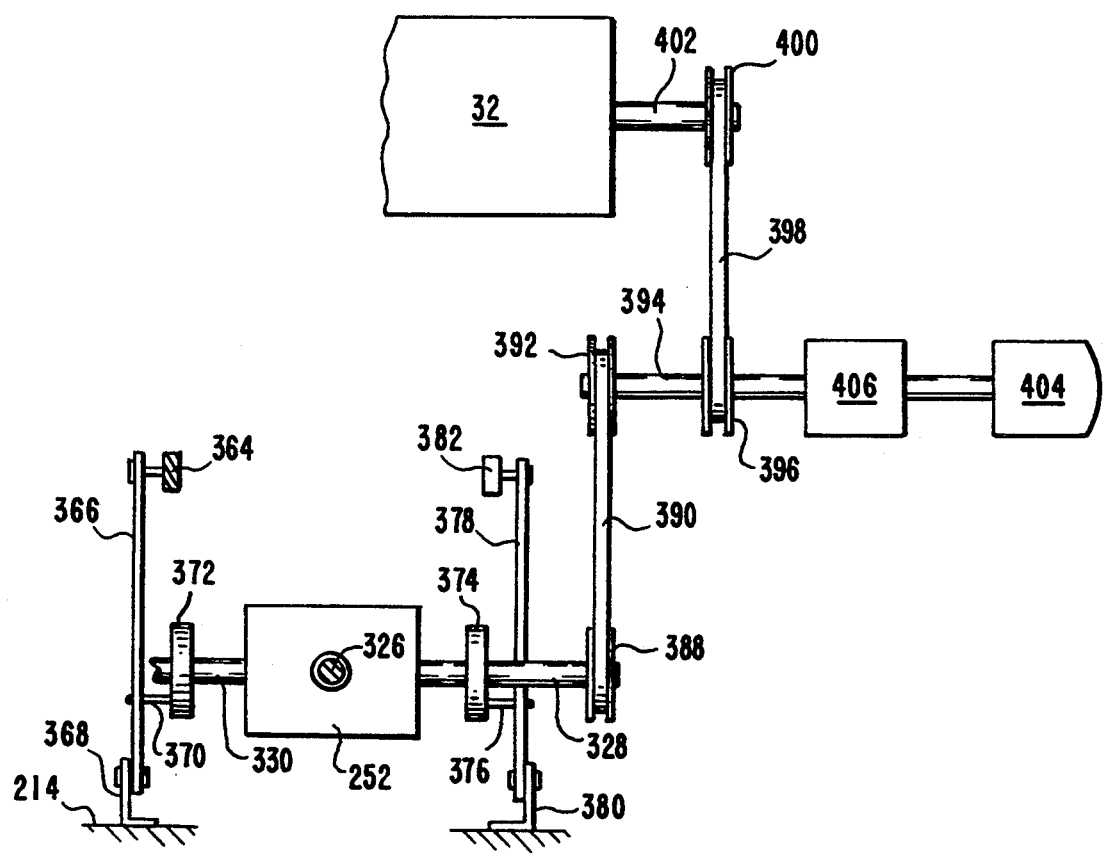
FIG. 3 is a diagrammatic view showing the linkage between the transport member indexing means and the loading/off-loading apparatus of the invention.

As shown in FIGS. 6, 7, horizontally disposed drive shafts 310, 312 are provided in parallel association with the upper surfaces of the respective arms 220, 222. These drive shafts are located on the above-mentioned imaginary centerlines and are mounted for rotation and supported in conventional bearing members adjacent their ends in the elongated openings 298, 306 and 300, 308. At the ends of the drive shafts 310, 312, respectively, are provided conventional beveled gears 314, 316 and 318, 320. The beveled gears 314, 318 provided at the inner ends of the shafts 310, 312 mesh with a beveled gear 322 provided at the top end of the elongated drive shaft 324. This drive shaft is rotatably mounted (not shown) according to conventional techniques within upright member 224 so as to be vertically upright. The lower end of this upright drive shaft 324 is operatively connected by conventional means to the upwardly defined output shaft 326 of index drive 252 (FIG. 3). The index drive is provided with horizontally disposed input shaft 328 perpendicular to shaft 326, and a horizontally disposed drive shaft 330, in opposition to shaft 328, the purpose for which will later be explained.

The beveled gears 316, 320 at the outer ends of the elongated horizontally disposed drive shafts 310, 312, respectively, mesh with beveled gears such as identified by reference numeral 332 provided at the top end of the vertically upright elongated drive shaft 334 rotatably mounted in conventional manner in the loading mechanism identified, in general, by reference numeral 336. See FIG. 6. The off-loading mechanism 384 is of identical construction and operation as the loading mechanism; accordingly, only the loading mechanism will be more particularly described hereinafter.

As shown in FIG. 6, the top end of drive shaft 334 is mounted in a conventional bearing member 338 located in the top end of the housing 282 and centrally within the circular-shaped cavity 286. A bushing 340 is provided in the lower end of housing 282 in usual manner through which the drive shaft 334 passes and which provides rotatable support for maintaining the shaft 334 in the upright position. The bottom end of drive shaft 334 intrudes into the elongated vertically disposed cavity 342 of a conventional, commercially available spline shaft 343 and is fixedly secured therein according to usual technique. The spline shaft 343 is fixedly located in conventional manner in the top portion of the elongated vertically disposed centrally located cavity 345 provided in the rotatable member 344. Thus, as the drive shaft 334 is rotated in horizontal and clockwise manner the rotatable member 344 will be rotated therewith. The rotatable member 344 is mounted for rotation in conventional bearings 348, 350 located in a circular-shaped housing 352. The housing 352 is provided with horizontally disposed outwardly projecting guide means 354, 356 in each of which is provided a vertically upright cylindrical-shaped opening (not shown) through which passes a vertically upright cylindrical-shaped rod or guide shaft 358. The top end of shaft 358 is fixedly located (not shown) in the bottom of housing 282. Thus, the guide shaft 358 insures the movement of the loading mechanism 336 in a vertical upright and downward motion on drive shaft 334, the reason for which will be disclosed hereinafter.

Connected to housing 352 in conventional fixed manner, e.g. by cap screws (not shown), is a connecting member 359, to which is pivotally connected the bottom end of vertically disposed link 360, the top end of which is pivotally connected to the elongated arm 278 at its outer end which, as earlier disclosed, is mounted for pivotal up and down motion at pivot point 362. The opposite or inner end of the arm 278 is pivotally connected to the top end of the vertically upright connecting arm 364 the bottom end of this arm being pivotally connected to the front end of the horizontally disposed elongated pivot arm 366. The back end of this pivot arm is pivotally connected to mounting fixture 368, this fixture being fixedly secured in conventional manner to the horizontally disposed platform 214 which supports the load/unload apparatus 16. The pivot arm 366 is pivotally connected at a point between its back and front ends to the outer end of the cam follower 370. The inner end of the cam follower is operatively associated with a conventional rise and fall cam 372 rotatably mounted on output drive shaft 330 of the indexer 252. The pivot arm 366, as best seen in FIG. 3, extends toward the dial 14 and is in perpendicular disposition to the cam follower 370 and drive shaft 330, these last-named members being parallel to one another.

On input shaft 328, directly opposed to output shaft 330, there is mounted a cam 374, like cam 372. The cam 374 is operatively associated with one end of the horizontally disposed cam follower 376, the opposite end thereof being pivotally connected to the elongated horizontally disposed pivot arm 378. This arm is pivotally connected at its back end to mounting fixture 380 and at its front end to the bottom end of vertically upright connecting arm 382. The top end of connecting arm 382 is pivotally connected to the inner end of pivot arm 280. The connecting arms 364, 382 are located in vertically upright spaced-apart planes parallel to one another and in the same vertically upright plane perpendicular to the said upright parallel planes. The horizontally disposed pivot arms 366, 378 are located in vertically disposed planes spaced-apart from one another and parallel to those spaced-apart planes in which the connecting arms 364, 382 (FIG. 3) are located. The pivot arms 366, 378 are located in the same horizontal plane parallel to the planar surface 216 of the supporting platform 214. Thus, on rotation of input shaft 328, the output shaft 330 from the indexer 252 rotates in unison therewith, and the cams 372, 374 rotate in unison. Thus, the pivot arms 366, 378 cause the connecting arms 364, 382 to rise vertically upwardly and downwardly in unison with one another, and in the same timed sequence, i.e., when connecting rod 382 moves vertically upwardly, connecting rod 364 moves in the same manner and to the same extent.

As the top ends of the connecting arms 364, 382 are pivotally connected, respectively, to the horizontally disposed arms 278, 280, these arms likewise move in synchronization with one another and to the same extent. Thus, when the connecting arms 364, 382 are caused to move vertically downwardly through the action of the respective cams 372, 374, the arms 278, 280 are caused to move upwardly at their outer ends, at the same time, and to the same extent. This action causes the respective loading mechanism 336 and unloading mechanism designated generally by reference numeral 384 (FIG. 7) to move vertically upright in sequence and to the same predetermined extent, as hereinafter further disclosed. And, when the connecting arms 364, 382 are caused to move vertically upwardly, the arms 278, 280 are caused to move downwardly at their respective outer ends causing the respective loading, unloading mechanism 336, 384 to move vertically downwardly in synchronization with one another. The extent of these vertical up and down movements of the loading and unloading mechanisms will depend primarily upon the extent of the vertical up and down movement desired for the loading and unloading mechanism, taking into consideration the overall operation of the system disclosed. Once this is determined, the location of the loading and unloading mechanisms on their respective drive shafts relative to the bottoms of the respective housings 282, 284 can be determined. Thus, referring to FIG. 6, the vertical up and down movement of loading mechanism 336 will be limited then, in general, by the vertical distance between the bottom of housing 282 and the top surface 386 of the housing 352, and the location of the spline shaft on the drive shaft 334. The downward movement is limited by the spline shaft, the upward movement being limited by the bottom of the housing. The vertical up/down movement of the loading mechanism is insured by the guide shaft 358, a similar guide means being provided with the unloading mechanism 384 but not specifically shown in the drawings.

On input shaft 328 there is provided a conventional pulley 388 (FIG. 3) around which passes one end of a drive belt 390 according to usual manner, the other end of the belt being operatively engaged with the pulley 392 provided on the elongated rotatable shaft 394, this shaft being in parallel disposition to input shaft 328. The pulleys 388, 392 are so located on their respective shafts as to provide belt 390 in perpendicular disposition to each according to usual technique. On the elongated shaft 394 there is provided a pulley 396 over which rides one end of a drive belt 398, the other end being operatively associated with the pulley 400 provided on the driven output shaft 402 of indexer 32. The shafts 394 and 402 are parallel to one another. Though not specifically provided for in the drawings, a slip clutch can be provided in combination with pully 388 and/or elsewhere, to avoid damage in the event of some malfunction, according to good engineering practice.

At the outer end of the drive shaft 394 there is provided a conventional encoder 404 coupled to the shaft 394 in usual manner by means of a thin wall or spline coupling 406. An encoder found suitable for use in the practice of the invention is an incremental optical encoder, available from Idec Izumi Corp., Sunnyvale, Ca. The thin wall coupling used can be obtained from Winfried M. Berg, Inc. East Rockaway, N.Y. The function of the encoder 404, as will be appreciated, is to track the rotation of the rotatable transport member so as to automatically provide a particular predetermined compact disc fixture 108 at a predetermined location, identified by reference numerals 1–23, in the transport member's circular-defined path of travel according to the predetermined operation of the cam or indexer 32 in the system. Thus, the air valve actuator 208 will be fired at the precise time that a compact disc 12 is being loaded onto the disc fixture 108 then located at the loading station, i.e., station No. 1, whereby the centering pin 196 will rise vertically upwardly, intruding into the center-hole 212 of the compact disc. Thus, the compact disc 12 is centered prior to its actually contacting the disc support member 146 located in the disc well 124. As a result there is no movement of the compact disc across the surface of the support member that will result in damage to the downwardly disposed recording surface of the disc. At the precise time, the centering pin 196 will be caused to retract by the Programmable Logic Control (not shown). Thus, the actuator 190 causes the two-way valve 166 to open, providing vacuum to the now centered disc. This vacuum is retained on that compact disc until the disc has been printed with each of its 3 colors, the ink cured, and that particular disc arrives at station No. 21 on its third time around the circular-defined path of travel for off-loading from the transport member 14. The encoder 404, once a disc has been loaded at station No. 1, tracks the indexing of that particular compact disc 12 through the various work stations, and finally to the station at which it, now printed as desired, is off-loaded. At the off-loading station, the actuator 190 is caused to operate at the precise time whereby the rotary lever 191 operates in counterclockwise fashion pushing in the two-way on/off valve means 171 closing off the suction to that particular disc receptacle so that the compact disc can be off-loaded. Although not specifically shown in the drawings, it is preferred that means be provided in association with the transport member for sensing the actual loading of a compact disc onto a disc fixture. Various sensing means can be provided to perform this function, as later more fully disclosed. Such a sensing means will be so located as to determine the presence of a compact disc, on the fly so-to-speak, as the arm on the pick-and-carry unit of the loading mechanism holding such a compact disc rotates around to load the disc onto the transport member, later more fully disclosed. On sensing the presence of a compact disc, this will trigger operation of the registering pin and providing of vacuum to that particular disc fixture. Importantly, however, if no compact disc is sensed, the actuator means 190 will not be caused to function and the vacuum valve on the disc fixture will remain closed. Thus, the efficiency of the vacuum system to the disc fixtures will be better maintained, as a line is not open to the atmosphere due to the absence of a compact disc in a particular disc fixture. This being the case, the vacuum force provided initially will remain constant to all the disc fixtures and not be lessened inadvertently from time-to-time.

Various other encoders are available commercially and may be found suitable in the practice of the invention. One such encoder is available from Dynapar Corp. of Gurnee, Ill. Other couplings may also be found suitable for use in this invention. The main requirement is that such devices be rotationally stiff and flexible in the other five axis. Such couplings are also available from Dynapar Corp. under the trade designation Flex-E-Grip. In general, the encoder to be used should be capable of 60 counts/minute and be able to track the location of the rotatable dial 14 and determine its location at any particular time in the operation of the printing system disclosed herein. The Programmable Logic Control (PLC) (not shown) is available from OMRON Electronics, Inc. of Schaumberg, Ill. under the trade designation Omron SYSMAC C200H. Other programmable control devices, however, as conventionally used may be found satisfactory in the practice of the invention and the automatic operation of the system and the synchronization of its various components as described in this application provided that such a controller provides input/output characteristics compatible with the operation of the various components and their operative combination in the printing system disclosed herein, as later believed made somewhat more clear. The programming of the PLC to provide automatic and cooperative operation of the various components of the system disclosed herein can be readily accomplished by a skilled programmer.

It will be appreciated by those skilled in the art that each of the components of this printing system involves certain control circuits to provide the automatic operation desired. And, that the system overall incorporates control circuits for the automatic and synchronous operations involved. Nevertheless, it is believed well within the art to provide the various, and most suitable, electronic components needed to control and operate the various apparatus components making up this printing system and to attain any of the various functions and operations as and when desired.

Referring again to FIG. 6, the elongated rotatable member 344 is fixedly connected at its bottom end, according to conventional techniques, to a rotatable pick and carry unit identified generally by reference numeral 408. The elongated cavity 345 is in communication with the inlet of each of the cartridge valves provided at the base of the cavity such as indicated by reference numerals 410, 412, the reason for which will soon be explained. Extending outwardly from the bottom of the pick and carry unit are three horizontally, disposed support arms 414, 416, 418 each supporting the top end of a vertically disposed elongated sucker arm 420, 422, 424, respectively. The support arms 414, 416, 418 are of equal length, the rotation of which defines a circular-shaped path in a horizontal plane parallel to that plane defined by the rotatable transport member 14. As will be somewhat better appreciated by reference to FIGS. 1, 7, it will be seen that the support arms are radially disposed and equally spaced-apart from one another, in this case 120 degrees apart. This spacing is determined, as will be appreciated by those skilled in the art, by the dimensions of the rotatable transport member, and the spacing between the compact disc fixtures 108, among other considerations.

To the bottom of the sucker arms are fixedly secured conventional rubber suckers 426, 428, 430. As shown in FIG. 6 of the drawings, the suckers are mounted to the ends of the respective sucker arms so that the cup face of each is horizontally disposed, facing downwardly, and in the same horizontally disposed plane, parallel to the support surface 216. The sucker 426 is provided with a centrally disposed opening (not shown) in its base which communicates with the bottom end of the vertically disposed, elongated circular-shaped opening 432 provided in sucker arm 420. The elongated opening 432 communicates at its top end with the outer end of the horizontally disposed elongated opening 434 provided in the support arm 414. The inner end of the tubular-shaped opening 434 communicates with the bottom end of the vertically disposed elongated opening 436, the top end of which communicates with the outlet of cartridge valve 410. Though the drawings show a single sucker cup, for sake of clarity, such a component having three cups has been used in the practice of the invention. These units are available commercially from Vicas Manufacturing Co., Inc. and are more specifically identified as a "mini-bellows style coupling."

Protruding outwardly from the loading mechanism housing 352 is a conduit means 438 for connection as indicated by the arrow, to a suitable vacuum source (not shown). The conduit 438 communicates with the internal cavity 440 provided in the housing 352 defined by its vertically disposed inner, circular-shaped peripheral surface. Although the outer vertically disposed peripheral surface 442 of the rotating member is in close proximity to the inside wall surface of housing 352 defining cavity 440, these surfaces are shown some distance apart in the drawings for sake of clarity. The rotable member 344 is provided on its outside surface with a horizontally disposed annular-shaped groove 444 in direct opposition to the inlet in the housing 252 for the vacuum conduit 438. The annular-shaped groove 444 is provided at its bottom with a plurality of openings (not shown) which communicate with the elongated cavity 345. Thus, vacuum is continuously applied to each of the sucker arms 414, 416, 418 and the associated suckers during operation of the printing system, except as hereinafter further disclosed. This results from the fact that the groove 444 functions as a manifold, such groove always being directly opposite the inlet end of the vacuum conduit 438 as the rotatable member 344 rotates.

Although not shown in the drawing for sake of clarity, it will be appreciated that a valve, like valves 410, 412 is provided in association with the sucker arm 422. In another embodiment of the invention, rather than providing a vacuum manifold 442 such as shown in the drawings opposite the inlet for the vacuum connection 438, that portion of the rotable member 344 can be provided of somewhat lesser diameter, terminating in a horizontally disposed surface just short of the top of the bearing 350. Thus, a U-shaped cavity facing outwardly will be provided for housing the inner portion of the bearing and providing an annular-shaped horizontally disposed surface as a part of the rotating member. In this surface then can be provided vertically disposed tubular-shaped elongated openings communicating at their bottoms with the respective three valves, e.g. as identified by reference numerals 410, 412. The third valve is not shown in the drawing. The top end of each such opening will communicate with the vacuum chamber provided and which communicates with the inlet 438 to the vacuum source.

The stems of the cartridge valves, as seen in FIG. 6, extend radially outwardly in horizontal disposition and are each engaged by a spring loaded member or actuator 446, in this case a spherical member such as a ball bearing ($\frac{3}{8}$" dia), a portion of which extends outwardly through a circular-shaped opening 448 provided in the bottom portion of housing 352 as shown in the drawing. The member 446 is spring loaded according to conventional techniques so that it is biased away from the valve stem. As will be appreciated, the suction cup on the vacuum to that arm at the loading station will need be deactivated so that the compact disc being carried by the pick and carry unit can be dropped off, onto the disc fixture. And, with respect to the off-loading mechanism, the vacuum will need be deactivated to the suction cup located on that arm, over the receiving apparatus. To accomplish this, the portion of the spring loaded member 446 protruding outwardly from the opening 448 is engageable by a vertically disposed planar-shaped ramp member 450, as shown in FIG. 15 of the drawing. This ramp member is defined by a back surface 409 and a surface 411 which tapers inwardly toward the loading, or off-loading mechanism, as the case may be, from top to bottom. Thus, as the loading mechanism 336 moves vertically downwardly, at location No. 1, later more fully described, the valve stem (not shown) engaged by member 446 is depressed sufficiently to allow vacuum to the suction cup at that location, which is always on to each of the sucker arms, to be interrupted momentarily, allowing a compact disc 12 to be dropped off, e.g., onto the compact disc fixture 108, located at station No. 1. When the spring loaded member is depressed, the conduit leading to the sucker arm of concern is blocked. Thus, atmospheric air back fills into the sucker arm via the sucker cup, resulting in no vacuum force on the disc and such falls off the pick and carry unit. The same operation occurs with the off-loading mechanism with respect to the suction cup carrying the compact disc to be dropped onto the receiving apparatus. Thus, the location of each such ram 450 will need be such as to accomplish these functions, taking into consideration the relative locations of the particular valves involved relative to the respective vertically disposed sucker arms. In general, the valves and spring loaded members should be so located as to be radially between two next adjacent elongated support arms, as this will allow mounting of each of the ramps so as not to interfere with the elongated arms or the vertical up and down motion of either the loading or off-loading mechanisms. Although not shown in the drawing, the particular location of the ramp and the manner of mounting the same can be readily determined by those in the art.

Various valves and actuating members to open and close the same, as and when desired, may be found suitable for use in the practice of the invention. One such a valve is commercially available from Clippard Instrument Laboratories, earlier mentioned, under the trade designation MJVO-3C. This is a minimatic 3-way cartridge poppet valve which can exhaust around the stem, a requirement in this particular construction of the loading and unloading mechanisms, whatever valve may be used. The valves are located each in horizontal disposition so that the inlets of each are in communication with the bore 345 and the outlet in communication with a sucker arm.

The unloading mechanism 384 is of like construction and function as the loading mechanism 336. The two mechanisms operate in timed sequence with one another with the operation of the transport member 14, and the sending and receiving apparatus 18, 20, later more fully described. The loading/unloading apparatus 16 communicates with the rotatable transport member 14. This apparatus is, in turn, tracked by the encoder 404, according to usual technique, which determines if all the various components are located in the right position for operation. The encoder communicates with the PLC in conventional manner so that the operation of the loading and unloading mechanisms is not only synchronized in the desired manner with the operation of the transport member but so that all desired operations of each is controlled automatically, the same as are those of the sending and receiving apparatus. Thus, when the printing system is in operation, in general, a compact disc 12 will be loaded onto the transport member 14 at station No. 1 by one arm of the pick and carry unit, e.g., arm 414, and at the same time a compact disc 12', which has been fully printed, as desired, will be off-loaded from the transport member 14 by one arm, e.g., arm 415 (FIG. 7) of the unloading mechanism 384 at station No. 21. More about the operation of the system and the loading/unloading apparatus later. At the same time, a compact disc 12, is being picked up by the next adjacent sucker arm counter-clockwise from the sender apparatus 18 and a printed disc is being deposited on the receiving apparatus 20 in a stack.

Figure 8:
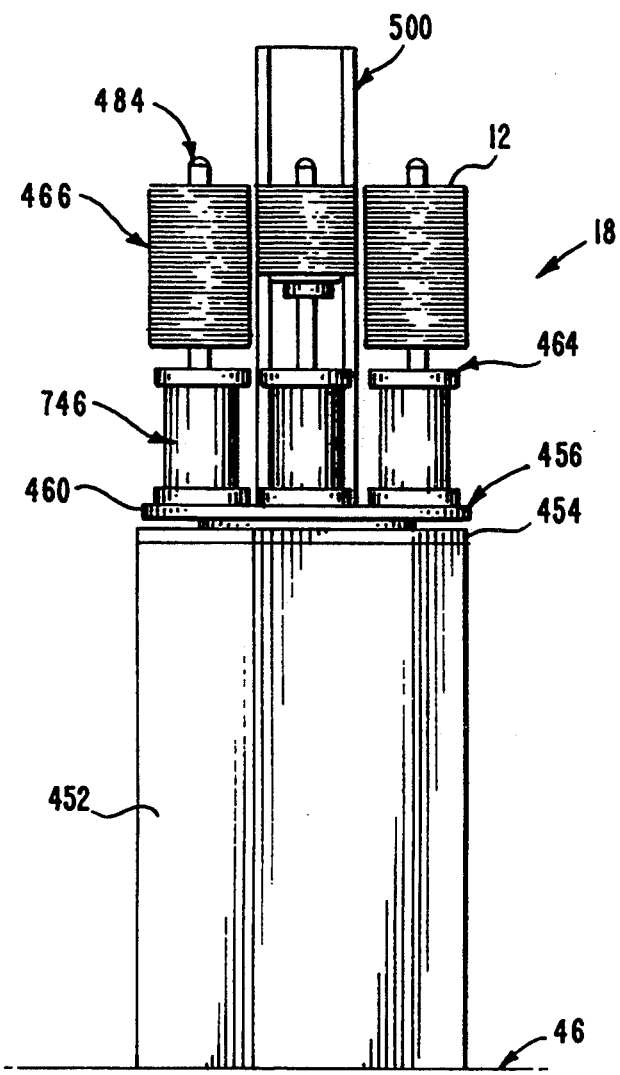
FIG. 8 is a front view in elevation showing apparatus according to another aspect of the invention for automatically feeding a supply of a plurality of compact discs in a plurality of vertically upright stacks to the loading mechanism of the loading/off-loading apparatus, each stack comprising a plurality of horizontally disposed compact discs on a stacking means supported on a spacer located on the indexing table.
Figure 9:
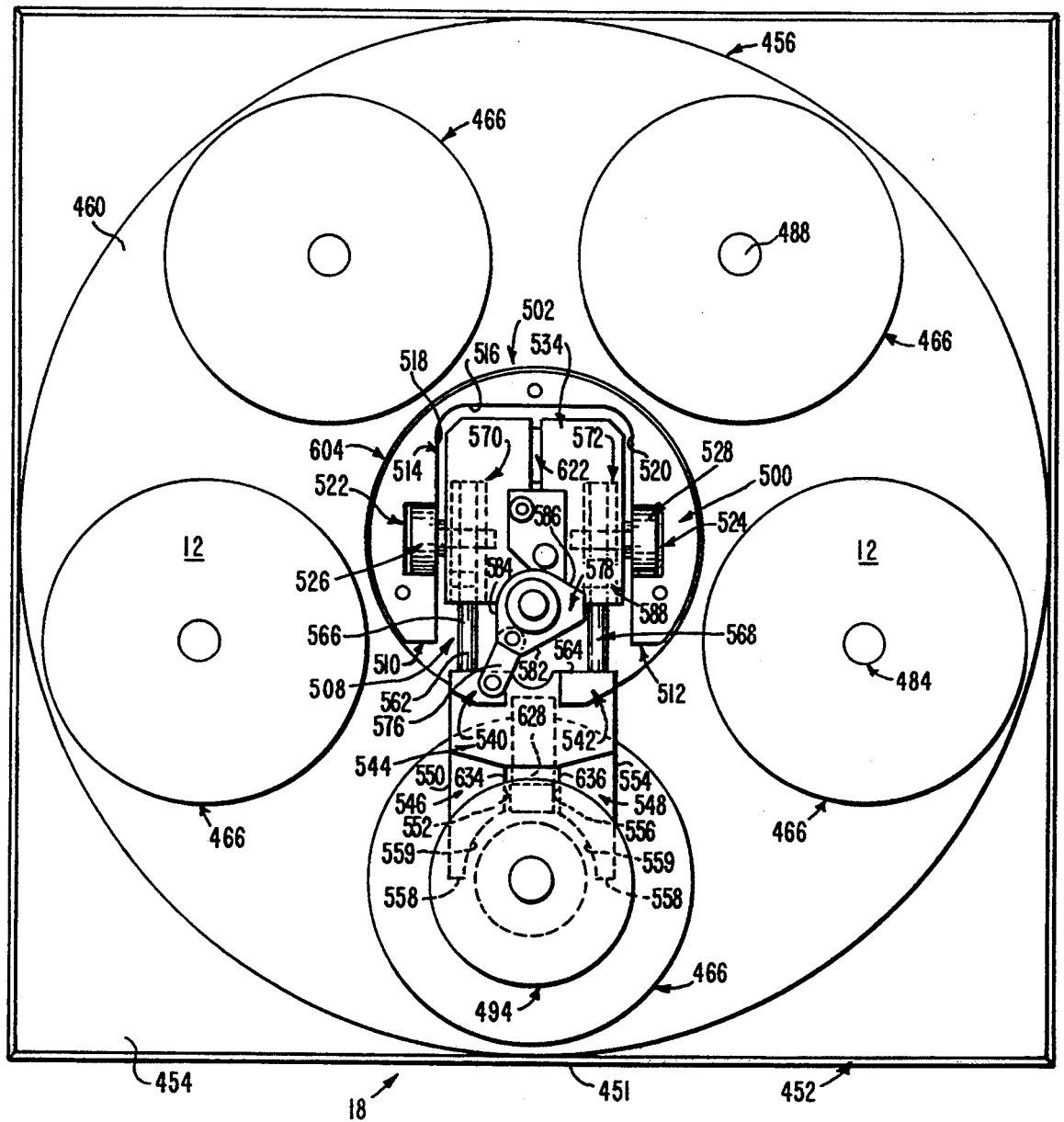
FIG. 9 is a top plan view of the feed apparatus shown in FIG. 8 showing the plurality of stacks of compact discs in spaced-apart manner and their circular-defined arrangement along with centrally located vertically upright elevator mechanism for raising of a stack of compact discs located at the load position to a predetermined vertical height for operative association with the loading mechanism of the loading/off-loading apparatus, the elevator mechanism being shown in cross-section and showing the horizontally disposed fork means at the bottom thereof in operative combination with the bobbin of the stacking means on the top surface of which a stack of compact discs is provided for lifting such vertically upwardly.
Figure 10:
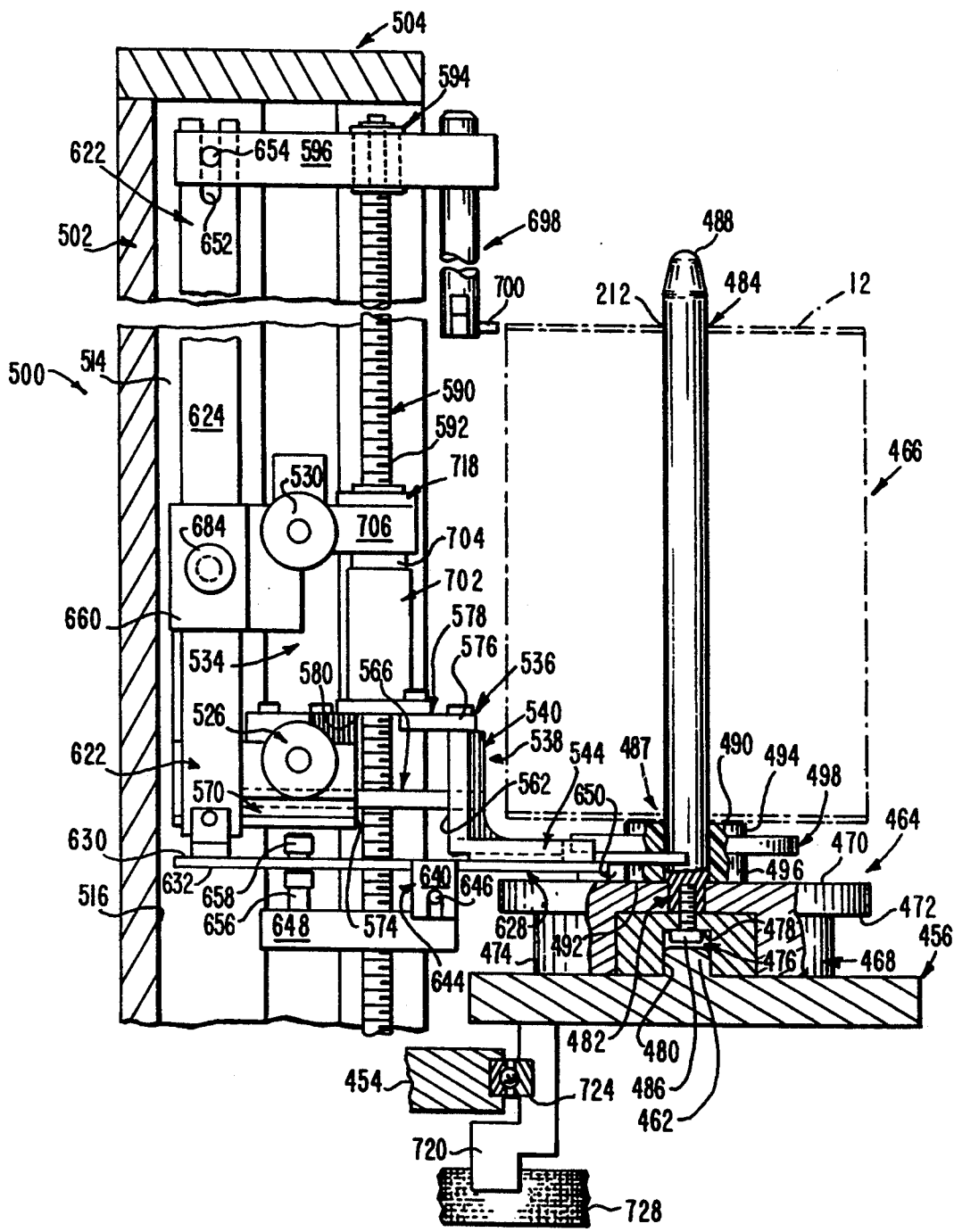
FIG. 10 is a partial longitudinal sectional view of the elevator mechanism showing the top portion of the screw and the carriage assembly for the fork member for raising a stack of compact discs to the predetermined height.

Turning now to FIG. 8 of the drawing, there is shown, in somewhat greater detail, the apparatus means 18 for automatically sending, i.e. feeding or supplying, a plurality of compact discs 12 to the printing system 10. This feed or sender apparatus 18 comprises, in general, a base cabinet member or housing 452 supported on the floor 46, the same as is the support frame 40 for the rotable member 14. This cabinet is provided with a horizontally disposed top member having a planar surface 454 above which is provided a horizontally disposed annular-shaped indexing table 456. This table is operatively connected to an indexer for rotation in clockwise fashion looking down at the table from above. The indexer is generally referred to by reference numeral 458 (FIG. 13) and is fixedly located inside the cabinet member 452, as hereinafter more fully described. The indexing table 456, as is best shown in FIG. 9 of the drawing, has a horizontally disposed planar top surface 460 parallel to the top planar surface 454 of the cabinet on which is provided a plurality of, in this case 5, upwardly extending equally spaced-apart protrusions identified generally by reference numeral 462 (FIG. 10). In removable association with each protrusion 462 there is provided a support means 464 for holding and supporting a vertically disposed upright stack 466 of a plurality of compact discs 12 superposed one above the other in horizontal planes parallel one to the other and to the top planar surface 460 of the indexing table 456. The support or stacking means 464, as best seen in FIG. 10, comprises a circular-shaped stacking base plate 468 having a top portion defining a planar horizontally disposed top surface 470 of a predetermined diameter approximately that of a compact disc parallel to a bottom planar surface 472. Extending vertically downwardly from horizontally disposed bottom surface 472 is an annular-shaped bottom portion defined by an upright peripheral outside edge 474 defined by a circle having a somewhat lesser predetermined diameter than the peripheral edge of the top portion, as shown in FIG. 10. The inside diameter of the annular-shaped bottom portion defines an upwardly extending circular-shaped bore or well 476 concentric with the circular-shaped top surface 470. This well 476 is defined by a planar top surface 478 and upright peripheral edge 480. The protrusion 462 intrudes into well 476 and maintains the stacking support means 464 in its desired location on the indexing table. The outside diameter of the protrusion 462, and the diameter of well 476 should provide a close fit. Moreover, the protrusion 462 should be of such height above the top surface of the index table, and the well 476 should be correspondingly deep enough, to provide vertical stability to the stacking support member.

The top portion of the baseplate 468 is provided with a circular-shaped centrally located opening 482 that communicates with, and is concentric to the well 476, the reason for which will be obvious from the drawing. Extending vertically upwardly and perpendicular to the top surface 470 is an elongated circular-shaped spindle 484 fixedly secured at its bottom end to the base plate or member 468 by a conventional threaded fastener 486 according to usual manner. The spindle 484 is provided with a rounded top 488 as shown in FIG. 10 and is of a diameter only slightly less than the diameter of the centrally located circular-shaped opening 212 provided in a compact disc 12. Thus, the compact discs will, importantly, have their outer circular-shaped edges in vertical alignment in the stack the surface bearing the recording facing downwardly. The spindle 484 is of a somewhat lesser diameter at the bottom end intruding into the opening 482 providing a horizontally disposed shoulder in contact with the upper surface 470 of the base member thereby providing better stability and ensuring the vertically upright orientation of the spindle 484.

Slidably engaged with the spindle 484 is a bobbin 487 having parallel planar horizontally disposed top and bottom surfaces 490, 492 located in planes parallel to the horizontal plane defined by the top surface 460 of the indexing table 456. The bobbin 487, as seen in FIG. 10, is further defined by annular-shaped top and bottom portions 494, 496 defined by the top and bottom surfaces 490, 492 and an integral, concentric, annular-shaped portion 498, the outer diameter of which is somewhat larger than that of the top and bottom portions, located intermediate to the top and bottom portion. The inner diameters of the annular-shaped portions defining the bobbin 487 are the same defining a continuous, vertically disposed, circular-shaped opening through which the spindle 484 passes. These inner diameters are only slightly larger than the diameter of the spindle, e.g. the same diameter as the center hole 212 of a compact disc, so that the bobbin 487 will fit closely with the spindle for purposes of stability yet be slidably engaged therewith, the reason for which will soon be disclosed. The bobbin 487, as shown in FIG. 6, has top and bottom portions 494 and 496 that are asymmetrical, the top portion is of a somewhat lesser vertical height than the bottom portion. This is of no concern to the general concepts of the invention but in the particular embodiment disclosed need be taken into consideration. There is no reason, however, why these portions cannot be of equal height provided the horizontal disposition of the fork member, as later described, is taken into consideration.

As shown in FIG. 9, five stacks of compact discs 12 are provided on the indexing table 456, the spindles 484 of each defining a circular-shaped path of travel concentric to the center defining the annular-shaped table. The circular-shaped protrusion 462, as will be appreciated, is functionally the extension of the spindle in each of the stacks. These protrusions 462 are so located that the centers of each lies at the cross-section formed by a radius of the circle defined by the outer edge of the index table and the circle defined by the path of travel of the center point of the stacks of compact discs. The protrusions 462 are equally spaced-apart from one another their centers being located 72 degrees apart in the sending apparatus 18 used in the practice of this invention. Thus, there are five fixed locations defined by the circular-defined path of travel, such locations being separate and distinct from the indexing table 456. Location No. 1, i.e the loading location or "load station" is the location from which discs 12 are picked up from the sending apparatus and transferred, hereinafter more fully disclosed, one-at-a-time by the loading mechanism 336, and thereafter loaded onto the disc fixtures 108 present at location No. 1 defined by the rotatable member 14, earlier described. The stations on the sending apparatus are identified in clockwise manner, as earlier described, station No. 1 being that station located at the bottom of the figure shown and directly in front of the viewer, e.g., at the 6th hour of a clock (FIG. 9). Station No. 2 is the next adjacent station from Station No. 1, in clockwise fashion, followed by Stations 3, 4, 5. The 5th indexing station, i.e., the "pre-load station", is located next adjacent station No. 1, in counterclockwise manner. Nevertheless, a greater or lesser number of locations and stacks of compact discs 12 can be provided for, as desired, depending somewhat upon the desired diameter of the indexing table 456 to be used, as well as upon the desired spacing between each of the stacking posts 462. In such a case it may also be necessary to use a different indexer 458 than that used in the practice of this invention, as hereinafter more fully described. Nevertheless, whatever the indexer used, the stacking posts 462 and support members 464 must be so located on the indexing table 456 as to be spaced equidistant from one another, the center of the base member of each stacking member 464, as earlier disclosed, being located on and defining a circle concentric to that of the circular-shaped indexing table. The stacks of discs 12 will desirably be located inwardly from the circumferential edge of the indexing table so that the edges of the compact discs 12 will not stick out from that edge.

Located centrally of the index table 456 and extending vertically upwardly from the circular-shaped opening 604 in the index table 456 is an elevator means or mechanism 500 for elevating a predetermined stack 466 of compact discs located at Station No. 1, i.e. the load station, to a specific predetermined height vertically above the index table, as hereinafter more fully described. When raised to that predetermined height, the loading mechanism 336 will be able to pick up the next compact disc 12 on the top of the stack of discs then being loaded, the top-most disc, and to transfer that disc 12 and load it onto the transport member 14 of the printing system. The elevator mechanism 500 comprises, as will be somewhat better appreciated by reference to FIG. 10, along with FIG. 9, a vertically disposed elongated circular-shaped housing or supporting member 502. The housing 502 has a top end 504 and a bottom end 506 (See FIG. 13). The housing member 502 is further defined by an open front 508 defined by the inner ends of vertically upright, spaced-apart, elongated planar edges 510, 512 located in the same vertical plane parallel to that of the front edge 451 of the cabinet 452. These planar front edges, at their inner ends, define an internal, elongated, vertically disposed cavity 514 having approximately the shape of a rectangle, as best seen in FIG. 9. The cavity 514 is defined by a vertically upright planar back surface 516 which is perpendicular to and intersects with the parallel, planar upright spaced-apart side walls 518, 520, and the vertically upright inner ends of the front edges 510, 512, defining the open front of the cavity. The planar side walls 518, 520 defining the cavity 514 are located equidistant from an imaginary vertically disposed plane dividing in half the planar back surface 516 parallel to side walls 518, 520 and passing through the center defined by the circular-shaped housing 502.

Figure 11:
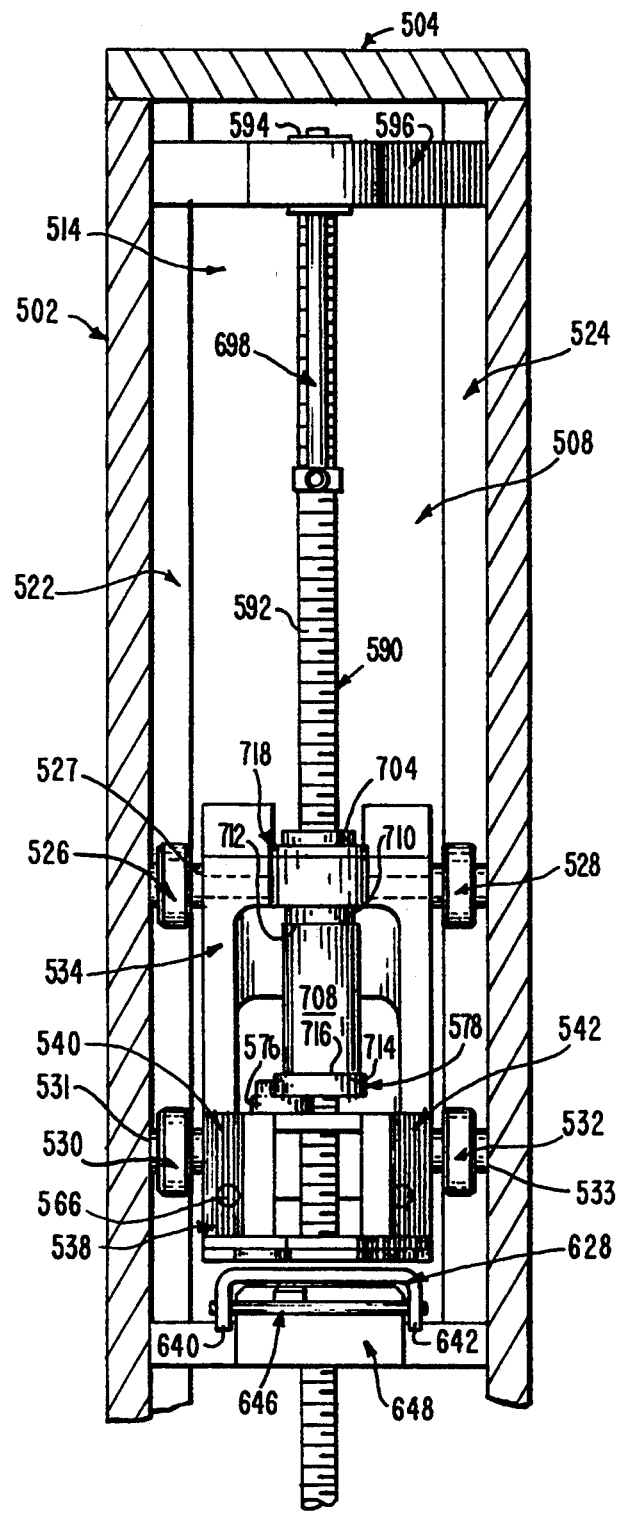
FIG. 11 is a partial front elevation view showing the top portion of the screw and the carriage assembly for the fork member along with the rollers for guiding the vertical up and down travel of the carriage assembly.

Provided in the sidewalls 518, 520 are vertically disposed rectangular-shaped elongated grooves 522, 524, respectively, these grooves being perpendicular to the said planar top and bottom horizontally disposed parallel ends 504, 506 of the supporting structure. The grooves 522, 524 are so located in the respective sidewalls as to be in direct opposition to one another and are bisected by a vertically disposed imaginary plane perpendicular to the sidewalls 518, 520 and passing through the center defined by the circular shaped support member. Located within the respective grooves 522, 524 are upper and lower pairs of rotatable guide wheels 526, 528, 530, 532 (FIG. 11). These guide wheels are mounted for rotation e.g., on axles 527, 529, 531, and 533, in conventional manner on the vertically disposed elongated body member 534 of the fork carriage assembly identified generally by reference numeral 536 (see FIG. 10). As shown more clearly in FIG. 11, the upper and lower pairs of guide wheels, respectively, are located in direct opposition to one another in the vertically upright guides 522,524. Thus, the guide wheels provide means for guiding the fork carriage assembly 536 in a vertical up and down motion, as later more fully described.

The fork carriage assembly 536 comprises a vertically upright fork support member 538 comprising two spaced-apart upright parallel support elements 540, 542, each being defined by a top end and a bottom end. To the bottom ends of the fork support member 538 there is fixedly connected a horizontally disposed fork member 544 perpendicular to the upright support elements. The fork member 544 comprises, as is shown somewhat more clearly in FIG. 9, two spaced-apart elongated legs 546, 548 defined by outer and inner parallel longitudinal edges 550, 552, and 554, 556, respectively, and front end edges 558, 560 perpendicular to the outer edges. The inner edges 552, 556 of the legs are shorter than the outer edges 550, 554 and connect with the inner ends of the end edges 558, 560 defining smooth curved inner edges 559, 561. The curved end edges 559, 561 define a semi-circle (FIG. 9) that conforms to the outer circumferential surface of the bottom portion of the annular-shaped bobbin, as shown in the drawings, when the fork is in operative engagement to raise a stack of discs. As seen in FIG. 9, the end edges 558, 560, in the more preferred aspect of the invention, lie on an imaginary line parallel to the upright member of the carriage and which passes through the center of the circle defined by the annular-shaped bobbin. The legs 546, 548, as will be appreciated, can be somewhat longer than shown in FIG. 9, provided the curved surfaces 559, 561 do not continue to curve at their respective outer ends but, instead, define a linear edge parallel to the outer edges of the fork members. The legs can even be somewhat shorter, if desired. This is less preferred, however, as it affords less stability to the stack of compact discs as such is being raised.

Extending to the rear and perpendicular to the back planar vertically disposed surfaces 562, 564 of the upright fork support members 540, 542, respectively, are provided conventional linear bearing rods 566, 568. These rods are of equal length and spaced-apart from one another in the same horizontal plane, parallel to the plane defined by the top surfaces of the fork legs and are fixedly secured at their front ends to the upright fork support members. The rearward free ends of the bearing rods 566, 568 are located in conventional linear bearings 570, 572 provided in horizontally disposed circular-shaped, spaced-apart elongated openings (not shown) provided at the bottom end of the carriage body member 534 and extending inwardly from the vertically disposed planar surface 574. Thus, when the fork assembly 538 is caused to move in a back-and-forth horizontal direction, as later more fully described, the bearing rods 566, 568 will be supported for reciprocal movement back and forth in the bearings 570, 572, respectively.

At the top end of the upright support member 540 is pivotably connected one end of an elongated horizontally disposed link 576. The other end of the link is pivotably connected to a threaded member or nut identified by reference numeral 578 having a centrally disposed circular-shaped opening 580 provided with an internal thread pattern (not shown). This threaded member is in the general shape of an isosceles triangle (see FIG. 9) defined by the base 582 and the equal sides 584, 586. Nevertheless, the apex, i.e., where the sides intersect, is rounded off, as shown in the drawing. And, the two sides and base are shortened providing flat ends as shown. Thus, the threaded member can be provided in a compact space and rotated in clockwise and counterclockwise manner in a horizontally disposed plane parallel to the plane defined by the top surfaces of the fork legs 546, 548, as later disclosed. The counter-clockwise rotation of threaded member 578 is limited by a horizontally disposed stop member 588, the purpose for which will soon be disclosed. As will be readily appreciated by those in the art, the threaded member 578 need not necessarily be of the same configuration as specifically shown in the drawings, provided such performs the necessary functions for such a member as disclosed hereinafter. The shape and size of the threaded member will depend, among other things, upon the relative sizes of the cavity 514, the fork carriage assembly 536, the length of the link 576, the length of the bearing rods, etc. The length of the bearing rods 566, 568 can vary somewhat, depending upon the length of the fork legs 546, 548, the length that such legs must travel, i.e. be retracted, to clear the bottom portion of the bobbin, etc. The optimum length of the bearing rods 566, 568 in any particular case, and the size and dimensions of the threaded member 578 can readily be determined by a skilled artisan. Importantly, the fork member must be retracted a sufficient distance to clear the bottom portion of the bobbin, as above disclosed; otherwise, the fork member will interfere with the rotation of the indexing table and the indexing of a stack into the loading position.

Located in and passing through the opening 580 in the threaded member is a vertically upright circular-shaped, elongated, rotatable member or screw 590 on the surface of which is provided an elongated thread pattern 592, matching with that provided in the opening of the threaded member or nut 578. Thus, as later more fully described, on rotation of the elongated screw member 590, the nut 578 will be caused to move up or down, depending upon the direction of rotation of the screw member and the friction between the two. The threaded member and screw should each be, most desirably, manufactured of materials having good frictional characteristics, allowing the screw to readily rotate in the threaded member, as hereinafter more fully disclosed. In the practice of the invention, the threaded member was of stainless steel. The screw was a metal screw coated with a layer of Teflon polytetrafluroethylene according to usual manner. The threaded member and screw can each be provided of other materials, if desired, e.g., a plastic material having low frictional characteristics such as DELRIN polyacetal resin. Nevertheless, no matter what the materials of construction of these components, the friction between the two must be capable of adjustment later more fully disclosed.

The screw member 590 is clear of the thread pattern at its ends, the top end thereof being rotably located in usual manner in a conventional thrust bearing 594 located in the horizontally disposed supporting structure 596 fixedly secured in the internal cavity 514 to housing 502. The bottom end of the screw member 590 is operatively connected for reversible rotation, clockwise and counterclockwise, as desired, to the drive shaft 598 of a conventional reversible stepping motor by coupling means 602, according to usual techniques (FIG. 13).

Figure 13:
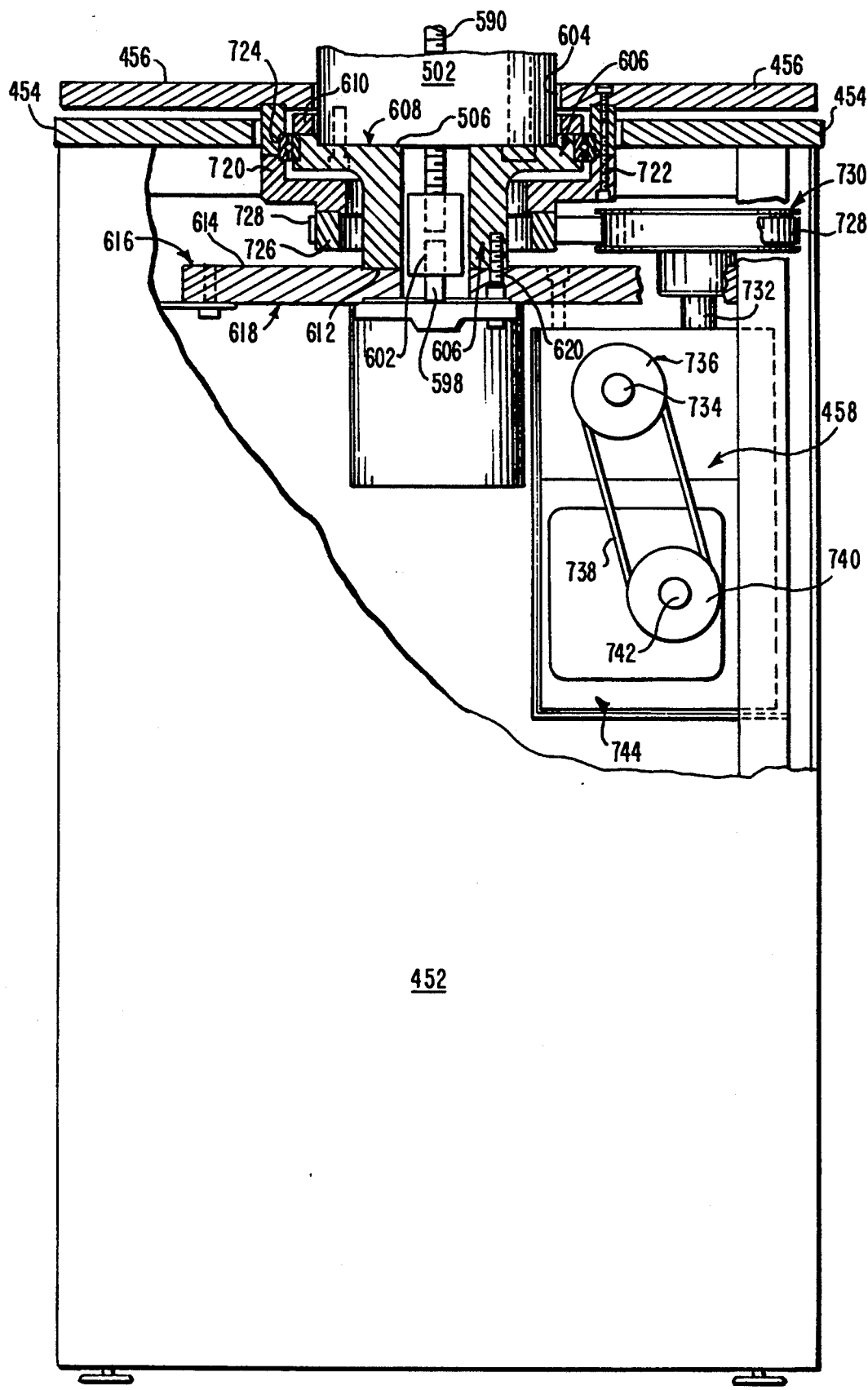
FIG. 13 is a schematic view partially in cross-section showing the connection of the base of the screw to a reversible drive motor for the driving thereof in rotary manner and the linkage of the indexer to the index table.

As seen in FIG. 13 of the drawing, the bottom portion of the housing or supporting structure 502 extends vertically downwardly and passes through the circular-shaped centrally disposed opening 604 provided in the indexing table 456. The planar bottom of the housing 502 rests upon and is fixedly secured to a fixed support member 606 having an upper horizontally disposed annular-shaped planar surface 608. This support surface is parallel to the planar top surface 456 of the indexing table. The support member 606 is centrally located, the annular-shaped top surface 608 thereof being concentric with the circular-shaped opening 610 provided in the top 454 of the cabinet 452 and the opening 604 provided in the indexing table 456. The horizontally disposed planar bottom surface 612 of the support member rests upon the horizontally disposed top planar surface 614 of the support platform 616. The top planar surface 614 is parallel to the top surface 454 of the cabinet. Although not shown in the drawing, the support platform 616 is fixedly connected according to usual technique to supporting framework located within the cabinet 452. Stepping motor 600 is located directly beneath platform 616 and in contact with its bottom surface 618. The stepping motor is connected to the platform and support member 606 by means of a plurality of conventional threaded fasteners such as indicated by reference numeral 620. This is readily accomplished according to usual technique. Various stepping motors may be found suitable in the practice of the invention. One such a motor which has provided satisfactory results is manufactured by Compumotor Div., Parker Hannifin Corporation, Rohnest Park, Ca. and sold under the trade designation PK 3-83-93. This motor is characterized by an output torque 150 in./ounces, a top speed of 300 rev./min. and by fast start/stop characteristics with ramping aspect. It needs of course to be reversible, i.e., capable of rotating the screw 590 in clockwise direction and then reversing itself, rotating the screw in counterclockwise direction, as hereinafter further disclosed.

Figure 12:
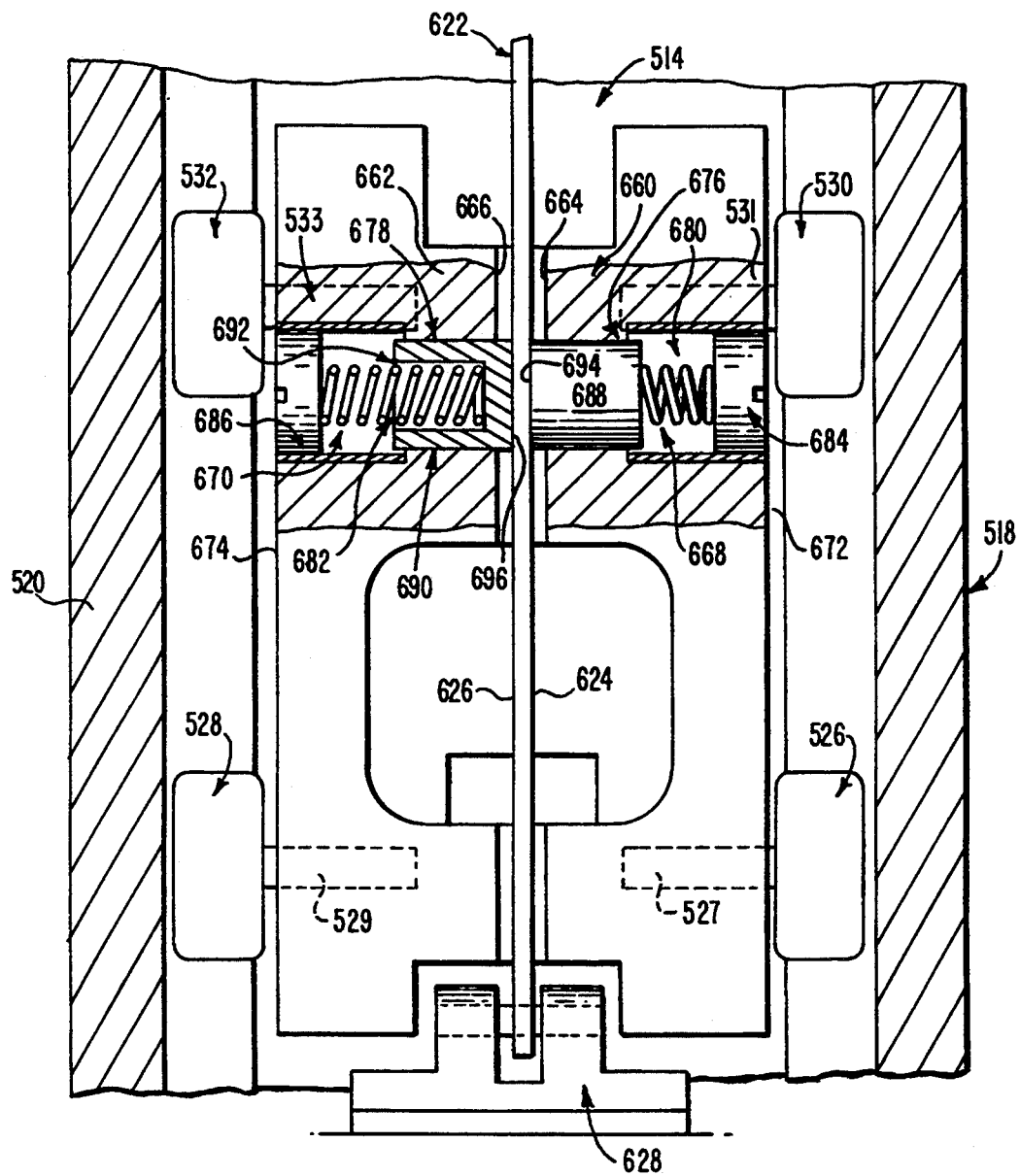
FIG. 12 is an elevation view taken from the back of the elevator mechanism and showing the brake pads associated with the carriage assembly in operative association with the vertically disposed clamp bar for providing sufficient drag on the clamp bar to pivot the clamping member at the base thereof so that such member provides a downward force to keep the spindle base plate member in position.

Turning now to FIGS. 10, 12, it will be seen that midway between the spaced-apart sidewalls 518, 520 is a vertically upright, elongated rectangular-shaped clamp activating member or clamp bar 622 defined by parallel planar faces 624, 626. The clamp bar 622 is so located within the cavity 514 as to be perpendicular to back wall 516 and equidistant from the parallel sidewalls. The bottom end of the clamp activating member 622 is pivotably connected to the back edge of the elongated horizontally disposed clamp member 628. This clamp member is defined by planar top and bottom surfaces 630, 632 the width of which at the front end is defined by longitudinal parallel side edges 634, 636 (FIG. 9). The clamp member 628 in its rest position, i.e., when the fork carriage assembly is located at the bottom of its travel, is perpendicular to the back side 516 of the cavity and terminates at its front edge 638 perpendicular to the side edges 518, 520. The clamp member 628 is pivotally mounted at a suitable point between its ends for up and down movement by means of downwardly protruding mounting flanges 640, 642. Connecting the mounting flanges together and to a fixed pivot support member 644 is the elongated mounting pin 646 which extends transversely to the sidewalls 518, 520 and parallel to the back wall 516. This pivot support member is upwardly extending and fixedly secured to a horizontally disposed frame member 648 fixedly secured within the cavity 514 in the bottom portion thereof opposite the spindle base or support member 464. Thus, when the clamp bar 622 is moved in a vertically up and down motion, the clamp member 628 will be caused to move in an up and down fashion by means of the pivot mounting pin 646. At the front edge of the clamp member 628 and fixedly secured thereto is a downwardly protruding member 650 which terminates in a bottom planar face. This face, as seen in FIG. 10, engages the top planar surface 470 of the stacking base plate 468, the reason for which will be hereinafter disclosed. The clamp bar 622 is provided at its top end with an elongated vertically disposed slot 652 in which is located a horizontally disposed pin 654 the ends of which are fixed (not shown) in the supporting structure 596 in conventional manner. This pin is provided perpendicular to the clamp bar or activating member 622 and in parallel disposition to the back wall 516 of the housing. Thus, the activating member can move a limited distance vertically up and down, as desired, the reason for which will soon be disclosed. The length of the slot 654 should be sufficient to allow the clamp bar 622 to move freely up and down to the extent desired. The extent of the movement up and down of the clamp bar 622 will be determined by conventional stop members 656, 658 located in opposition to one another and above and below the clamp member 628. The bottom end of each of these stop members is located in a threaded bore provided in the frame member 648 according to conventional techniques. The stop members are each adjustable in usual fashion, as desired, so as to provide the other end thereof nearer to or farther away from the top and bottom surfaces 630, 632.

Extending perpendicularly outwardly from the back side of the carriage assembly body member 534 are spaced-apart drag members 660, 662 defined by opposed planar, parallel vertically disposed spaced-apart surfaces 664, 666, respectively. These drag members are provided with circular-shaped, horizontally disposed bores 68, 670, respectively. These bores extend inwardly from the respective outer planar, vertically disposed surfaces 672, 674, parallel to surfaces 664 and communicate with the horizontally disposed bores 676, 678 having a circular shape but of somewhat lesser diameter. In the bores 668, 670 are provided elongated coiled springs 680, 682, respectively, the respective outer ends of which are located in dead bores provided (not shown) in circular-shaped plug members 684, 686. These members, if desired, can be provided so as to be adjustable in and out of the bores in which each is located, e.g., by providing matching thread patterns on the mating surfaces according to conventional techniques. Thus, in this way somewhat greater or less tension can be provided in the coiled springs so as to provide a greater or lesser force, as desired, against the sides 624, 626 of the clamp bar, the purpose for which will soon be made known. The inner ends of the springs are located in dead bores provided in circular-shaped members 688, 690 such as indicated by the dead bore 692 provided in member 690. The members 688, 690 each have a diameter somewhat less than the respective bores in which they are located so as to be slidable therein. The outer ends of the members 688, 690 telescope into respective bores 668, 670, as indicated in the drawing (FIG. 12). The members 688, 690 are provided with vertically disposed planar faces 694, 696 respectively, which press against and frictionally engage the opposing planar faces 624, 626 of the clamp activating member 622. As a result, the members 688, 690 provide a braking action or drag on the upward and downward movement of the fork carriage assembly 536. The braking members 688, 690 can be provided of various materials provided the clamp activating member can slide therebetween, as desired. The springs in combination with the brake members should provide enough force against the clamp activating member as to cause the clamp activating member 622 to be pulled slidably upwardly with the upward travel of the fork carriage assembly as hereinafter later described.

It will be appreciated that as the clamp activating member 622 moves upwardly, the clamp member 628 is caused to pivot from the horizontal position downwardly at its front edge. Thus, the downward protruding member 650 presses against the top surface 470 of the base plate member 468 providing a downward force against and preventing the stacking base plate 468 from moving upwardly along with the fork carriage assembly 536 during the raising of the stack 466 of compact discs 12 upwardly. Thus, the stacking base plate 468 is caused to remain on the index table 456 and seated on its post 462. This is an important feature of the invention, particularly where a large number of compact discs 12 may be located on the spindle 484, due to the close tolerances between the spindle diameter and the diameter of the centrally located openings 212 in the compact discs. Without a downward force being applied against the stacking base plate 468, as above disclosed, the compact discs 12 cannot be readily stripped from, sometimes not at all, the spindle 484, as the fork carriage assembly is raised vertically upwardly. This results from the frictional engagement between the spindle periphery and the periphery of the center hole of the compact discs causing the base plate, spindle and stack of compact discs to move as a unit, rather than allowing the compact discs to slide upwardly on the spindle 488 and to be separated therefrom, along with the bobbin 488 later more fully described. The movement up and down of the front edge of the clamp is limited by means of the stop members or adjusting screws 656, 658 located above and below the clamp member.

Provided at the top end of the main supporting structure, i.e., housing 502, and fixedly secured in the horizontal support member 596 there is provided in a predetermined forward location a conventional fiber optic sensor assembly 698 comprising a diffuse-reflective fiber optic sensor 700. Such a sensor is commercially available from Effector, Inc. of Easton, Pa. This sensor, in general, functions to detect the presence of a compact disc 12 at a predetermined height. This height is determined largely by the length of the housing 502 extending vertically above the floor or the index table 456, as desired. The sensor assembly 698 is mounted so as to be adjustable vertically upwardly or downwardly whereby any final adjustment can be made so that the optical fiber sensor 700 will be positioned directly opposite to the topmost compact disc 12, as shown in FIG. 10, when the stack of compact discs is first raised upwardly to the height desired. Then, as that topmost disc is picked up and transferred to dial 14, the fiber optic sensor detects the absence of a disc 12 at that set height, causing the stack of discs to be raised incrementally so that the next disc in the stack, i.e., the now topmost disc, is sensed by the sensor 700 and the fork carriage assembly stops, momentarily, its upward movement. The optical fiber sensor is capable of also functioning as a counter. Thus, the sensor mounted on the receiving apparatus 20 counts the number of discs stacked on a spindle, determines when such spindle has the predetermined number of discs thereon, and causes the indexer associated with that apparatus to index an empty spindle into the loading position. The predetermined height to which the stack of compact discs 12 is raised by the elevator mechanism 500 must be such as to allow the loading mechanism 336 to pick-up the topmost compact disc and transfer it to the loading station. Thus, it will be necessary, as will be appreciated by those skilled in the art, to coordinate, in particular, the vertical lengths of the housing 502 and the housing 224 of the loading/unloading mechanism, and the distance that the loading mechanism moves up and down.

Referring now again to FIGS. 10, 11, there is shown in operative combination with the elongated screw 590 an anti-backlash nut or friction adjusting means indicated generally by reference numeral 702, for removing excessive end play in the threaded member 578 and to provide the desired interference in the threaded interface between the screw and threaded member 578. The adjusting means 702 is commercially available and well known to those skilled in the art. In general such a means comprises an elongated vertically disposed annular-shaped bushing 704 having an outside thread pattern (not shown) that engages with the inner thread pattern (not shown) provided in the horizontally disposed flange member 706 extending forwardly from the carriage body member 534 of the fork carriage assembly 536 at its top end. Located below the flange member 706 is an elongated cylindrical shaped spacer element 708 having a top horizontally disposed annular-shaped end 710 in contact with the horizontally disposed bottom end 712 of threaded bushing 704. The horizontally disposed bottom end 714 of the spacer element, parallel to bottom end 712, is in contact with the horizontally disposed, top planar surface 716 of the threaded member 578. Thus, by turning the threaded bushing 704 more or less play will be provided between the fork carriage assembly 536 and the threaded member 578 through which the elongated screw 590 passes and with which it is operatively engaged. Importantly also, the adjusting means allows adjustment of the frictional interface, as above-alluded to, allowing control over the in and out movement of the fork member 540. Once the bushing 704 is adjusted, as desired, any unintended loosening thereof resulting in excessive play between the carriage assembly and threaded member 578 can be prevented by a conventional locking nut 718 in usual manner. Thus, the threaded member 578 is captured axially on the elongated screw 590 relative to the fork carriage assembly. It will be appreciated that the internal dimensions of the elongated openings in the bushing and spacer element and in the centrally disposed opening (not shown) in the locking nut 718 must be such as to be out of contact with the thread pattern 592 provided on the screw 590. The length of the spacer element 708 will depend somewhat upon the vertical distance on the carriage assembly between the flange 706 and threaded member 578. In any event, the length thereof, in combination with the bushing 704, need be such as to take up any slack and provide control of the friction interface, as earlier described.

Turning now to FIG. 13, it will be seen that the rotatable annular-shaped indexing table 456 is fixedly secured to and mounted on the rotatable member or ring bearing support 720 using conventional means such as threaded fasteners indicated generally by reference numeral 722. Thus, access to other functions hereinafter described is possible through the center opening of the table. The rotatable member 720 is of a somewhat annular-shape conforming to the shape of the fixed support member 606 which resides internally of the rotatable member 720 and centrally disposed therein, as shown in the drawing. Between the outer circumference of the top portion of the fixed support member 606 and the inner circumference of the top portion of the rotatable member 720 there is provided an annular-shaped bearing member 724 in usual manner. The bottom circular-shaped outer portion of the rotatable member 720 is provided according to usual technique with a horizontally disposed pulley means 726 around which rides one end of the horizontally disposed timing belt 728, the other end riding around the pulley 730 located on the output drive shaft 732 of the indexer 458. Thus, the indexing table 456 is driven by the indexer 458, a conventional three-stop indexer. Various such mechanical indexers commercially available can be used in the practice of the invention provided such is three-stop and has a dwell index ratio of 180 degrees. The indexer used in the invention is available from Camco Custom Cams, earlier disclosed, under the trade designation RG30. The input drive shaft 734 of indexer 458 is provided with a pulley 736 over which rides one end of a drive belt 738, the other end riding over the pulley 740 located on the drive shaft 742 of the variable speed motor 744. A motor found to provide satisfactory results in the practice of the invention is available from Minaribe Electric Co. of Glendale, Ca. Nevertheless, in general, any motor having a parallel shaft, helical gear and is a permanent magnet D.C. motor will be found satisfactory provided it produces the necessary torque. Whatever motor is selected, however, should be capable of variable speed, and have suitable speed range to accomplish the purpose for which it is intended. The selection of a suitable motor is well within the skill of the art. As usual, the motor can be torque limited to prevent damage in the event of a jam by association with a conventional controller. Thus, the indexer 458 will provide the desired torque and rotation to the indexing table 456 and cause the stacks of compact discs provided thereon to each index in sequence to the appropriate location, as hereinafter further described. As earlier disclosed, the indexer 458 used is a three stop indexer. Accordingly, the ratio of the diameters of the driving and driven pulleys, i.e., between the diameter of pulley 720 and 726, need be such as to convert the three stop motion to the five stop motion capability of the indexing table 456. The selection of pulleys of the most appropriate diameter is well within the skill of those in the art.

Turning now to FIG. 8, it will be seen that, in the embodiment shown in that figure, contrary to that shown in FIG. 10, stack spacing means 746 are provided for use in the handling of short stacks of compact discs 12, i.e., stacks of a lesser number of discs therein than generally provided for in the operation of the particular loading and sending/receiving apparatus. This is of particular concern as the loading/unloading mechanisms, and the elevator mechanism are, in general, designed and constructed to pick up the topmost compact disc in a stack at a certain predetermined height and to provide such a disc at that height, respectively. And, moreover, as a result, the sensor location for sensor assembly 698 is also somewhat predetermined and the sensor 700 can be positioned and repositioned upwardly and downwardly only to a limited extent. Thus, in the construction of the elevator mechanism, one should keep in mind not only the predetermined vertical distance that the stack of compact discs is to be raised, but also the limited vertical movement of the loading mechanism. Thus, the maximum number of compact discs 12 that are to be provided in any particular stack will be first determined. In the practice of the invention, the maximum number of discs to be provided in a stack has been set as a practical limit at 200 discs. And, the predetermined height for location of the topmost disc sensor 698 has been set with that in mind, along with the limitations on the vertical up and down movement of the loading mechanism and the height of the elevator mechanism, i.e., the maximum extent that the fork carriage assembly is to move vertically upwardly. This predetermined height has been arbitrarily set at a nominal height of 40 inches above the floor. Thus, when stacks of a lesser number of compact discs are desired, or necessary because of the remaining number of discs to be printed in any particular run, a 100 compact disc stack, rather than a stack of 200 discs, a stack spacing means 746 most desirably is used to prevent wasted travel of the fork carriage assembly, travel time, etc. and to provide a more efficient operation. The stack spacing means 746 used in such a case, as shown in FIG. 8, is an elongated member having generally an I-shaped cross-section and top and bottom parallel planar surfaces. Although not shown in the drawing, the top surface will be provided with an upwardly extending protrusion like protrusion 462 provided on the annular-shaped index table 456. See, for example, FIG. 10. And, the bottom surface of the spacing means will be provided with an upwardly extending well such as the well 476 provided in stacking base plate 468. Thus, the spacing means 746 will be retained in place on the rotatable index table, and the stacking means 464 on the top of the spacing means. It is necessary, of course, that the protrusion and well provided on and in the spacing means be concentric with one another. Spacing means of various heights can be used in the practice of the invention, dependent upon the desired minimum number of discs in a stack and upon the height of the spindle.

In operation of the 3-color silk-screen printing system disclosed in this application, the compact discs 12 to be printed are loaded onto a plurality of stacking means 464. Each spindle 484, as disclosed herein, will accommodate a stack of 200 compact discs, without the presence of the spacer. In this case the spindles have a height of about 14.8 inches, and the bobbin height is about 0.7 inches. This leaves the top about 14.1 inches of the spindle free for stacking the compact discs. The loaded spindles are then each placed on the indexing table 456 of the automatic feed means 18. This loading is made in a counterclockwise fashion, loading the first spindle onto the indexing table at the location next adjacent the pre-load station. No stacking means are provided at the load and preload stations on the indexing table. The pre-load station is the station just prior to the load station, moving in counterclockwise fashion. The load station is the station located directly in front of the fork member of the fork carriage assembly. See FIG. 9. It is important that such manner of loading occurs, particularly if the number of compact discs to be printed, or the remaining number in any particular printing operation, is insufficient to provide loaded spindles for all the spindle posts. As earlier disclosed, with the stack spacer on a spindle, the system can operate with only 100 compact discs on the spindle, not 200. The spacer used in this case will have a height of about 6.44 inches. Thus, in some cases where there may be fewer compact discs 12 to be printed at any one time, it may be desirable to provide stack spacers on each of the stacking posts or protrusion 462, or at least on one or more of them. With appropriate use of spacers and spacers of the desired height, the number of compact discs 12 to be accommodated on the index table can vary somewhat.

When the automatic feed means 18 has been loaded as above-disclosed, it is then moved into position, if such is a free standing unit, as shown in FIG. 1. Thus, the feed means is moved closely adjacent the transport member 14 so that the protrusion 462 on the feed means index table at the load station is located directly under a sucker, e.g., the sucker 430 on sucker arm 418. The sucker arm 414, in this case, will locate the sucker 426 directly above the disc fixture 108 at station No. 1 on the transport member. The correct positioning of such can readily be determined by eye. Nevertheless, if desired, docking features such as rails on the floor adjacent the loading/unloading apparatus 16 can be provided, according to conventional technique. Also, if desired, the automatic feed apparatus 18 can be fixedly connected to the frame 40 so as to always be in the correct location relative to the rotatable transport member 14 and loading/unloading apparatus 16. It is important where the automatic feed means 18 is a detached unit that such be initially oriented relative to the load-/unload apparatus 16 that the feed apparatus is in operative association with and properly located under the loading mechanism 336 of the loading/unloading apparatus. Thus, the stack of discs in the location next adjacent the pre-load position counter-clockwise will be properly located so as to be indexed into the pre-load position and subsequently into the load position, as later somewhat more fully disclosed.

In similar manner, the receiving apparatus 20 (FIG. 1) will be located relative to the unloading mechanism of the loading/unloading apparatus. The receiving apparatus is of similar construction as the feed apparatus 18, earlier disclosed. This apparatus does not, however, require the disc elevator mechanism earlier described. Thus, the receiving apparatus 20 comprises, in general, only the combination of the stacking means and indexing apparatus. The printed compact discs 12' are each removed, one-at-a-time, from the transport means by the unloading mechanism and then are dropped onto a spindle at the unload (load) station. Thus, in positioning the receiving apparatus 20 relative to the unloading mechanism, it is necessary that a sucker cup be located directly above the centerhole provided in the disc fixture located at station No. 21. With such orientation, the next adjacent sucker clockwise will be located directly above a stacking means in the unload position, as shown in FIG. 1 of the drawing.

When the stacking means at the unload position on the receiving apparatus is full, i.e., provided with a stack of compact discs of the desired number, the indexer indexes that stacking means in clockwise manner to the next location for removal by the operator of the stack of printed discs from the indexer table. The printed compacted discs are subsequently removed from the stacking means for further handling, as desired. An optical fiber sensor assembly, as earlier disclosed, is provided on the receiving apparatus to determine when the stacking means is full. This sensor assembly can be mounted on the housing 502 (not shown on the receiver apparatus) or elsewhere as desired. At the same time, the empty spindle located at the pre-unload (pre-load) location is caused by the sensor to index into the unload location. Rather than providing distinct apparatus for the sending and receiving of compact discs, as above-disclosed, like apparatus can be used for both functions, if desired, with some temporary modification. Nevertheless, if like apparatus is used both for the feeding of compact discs to the loader/unloader apparatus and for receiving of compact discs 12' therefrom, the elevator mechanism 500 can be removed except for the housing 502 or deactivated, as desired, and left in place. This deactivation can be readily accomplished most preferably by a program electronically, according to conventional techniques, to disconnect the elevator circuit. Nevertheless, this could also be accomplished by uncoupling the screw 590 from the drive means for this member, as disclosed earlier herein.

Once the feed and receiver apparatus are located in position, the vertical height of each such apparatus, relative to the loading/unloading apparatus, can then be adjusted, if needed. This is readily accomplished by height and leveling adjusting screws provided on the base of the cabinet housing the indexer, according to usual technique. The system is then ready to be activated for the particular compact disc printing operation at hand. Thus, the cycle button on the control panel is pushed, causing the system and its various components to be placed in the starting mode. At that time, two optical sensors as earlier disclosed, provided at the pre-load position in suitable location, monitor the presence of a non-empty spindle, i.e., it at least has one compact disc thereon, the orientation of a bobbin, and the presence of a "misplaced" bobbin. A misplaced bobbin is one in which the bobbin is not properly located on the spindle, e.g., the top surface of the bobbin is not actually horizontally disposed and parallel relative to the top surface of the index table. By orientation of the bobbin, such must be so located that the short side thereof is the top portion, as shown in FIG. 10. It will be noted from that figure of the drawing that the top and bottom portions are asymmetrical, a characteristic in the bobbins used, as obtained from the manufacturers of the stacking means, a conventional unit commercially available. This orientation is required due to the built in characteristics and home location for the fork member. Nevertheless, there is no reason why symmetrical bobbins cannot be used provided such has been taken into consideration in the design of the elevator mechanism. If an empty stacking means is detected, the system will treat the stacking means as "no good" and the feed apparatus will not attempt to send compact discs from this stacking means. The indexer 458 will then index the next adjacent stacking means counterclockwise into the pre-load location, at the same time indexing the stacking means in the pre-load station into the load position. The optical sensors in the preload position once again determine whether a "good" stacking means is present at that position. If a good stacking means is detected, the indexer then indexes that stacking means into the load position. The "no good" spindle previously in the load position is indexed to the next station clockwise for removal and replacement with a stacking means having a stack of discs of the desired number, properly oriented bobbin, etc. In the event, a non-empty spindle and good bobbin is detected at the pre-load position, and a good bobbin is already present at the load position, the system will then "remember" the good stacking means and spindle until such time that the good stacking means is then indexed into the load position. The cycle continues thusly until all the compact discs have been sent to the loading mechanism and transferred to the transport member for printing. If a good stacking means is not sensed after five attempts, the feed apparatus is programmed to shut itself off. The remainder of the printing system, however, remains in operation and does not stop unless there is no place to stack a printed compact disc, the stacking means on the receiver apparatus is full and for some reason has not indexed forward, allowing an empty stacking means to index into the load position.

Figure 14:
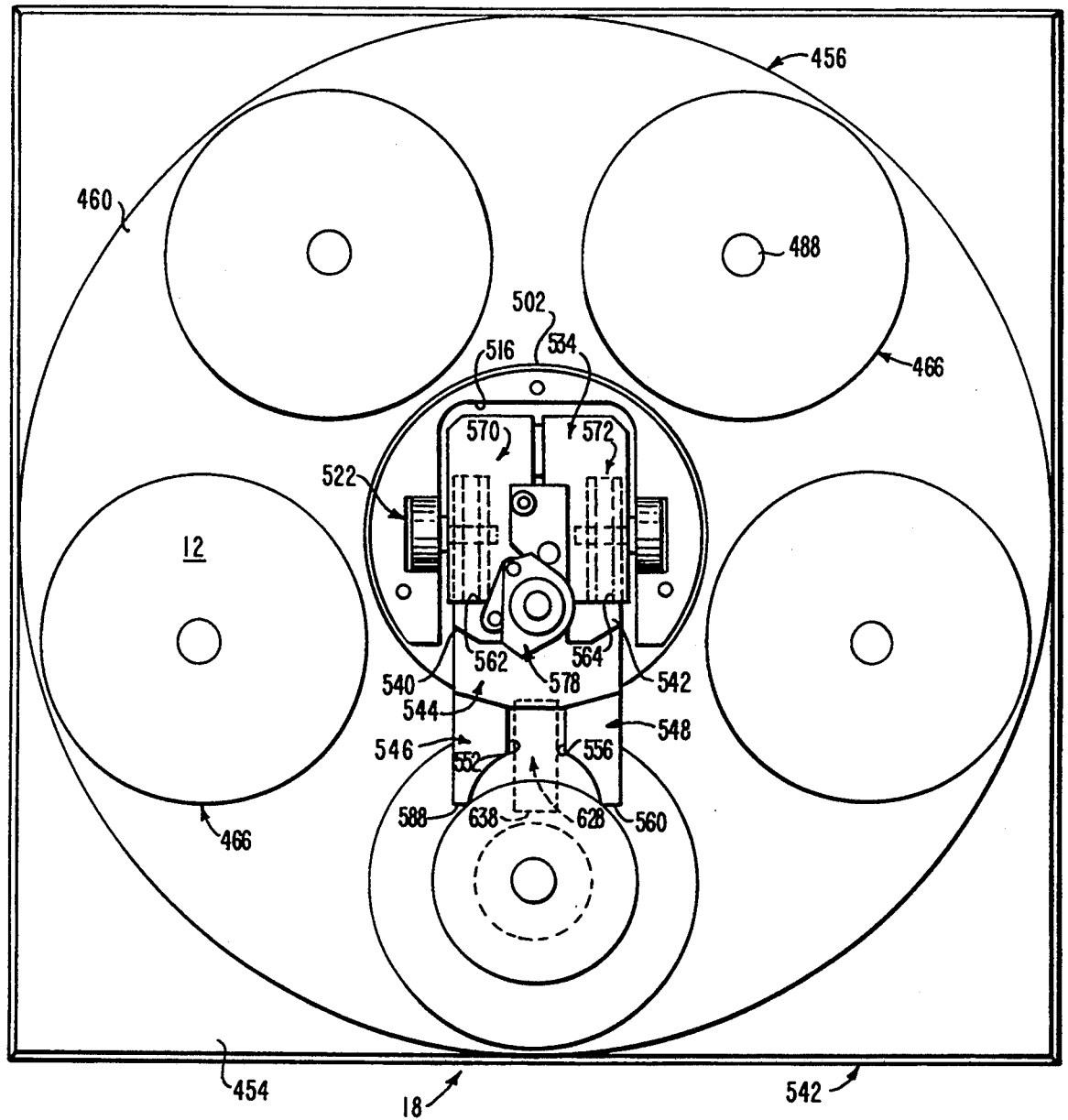
FIG. 14 is a top plan view of the compact disc supply apparatus like that shown in FIG. 9 but showing the fork member in its retracted position so that a new stack of compact discs can be indexed into place from the pre-load location to the load location for operative association with the loading/off-loading apparatus.

On indexing of a good spindle into the load position on the feed apparatus 18, the stack of discs on that stacking means is automatically elevated by the elevator mechanism to the predetermined "send" position, i.e., the height vertically upwardly to meet the loading mechanism. This send position can be varied somewhat, if desired, by adjusting the vertical location of topmost disc right angle optical sensor 700 located near the top of the elevator mechanism, earlier described. The stack of compact discs 12 is lifted by the fork carriage assembly, the fork member 544 of which extends under the bobbin on the spindle (FIG. 10). The fork member 544 is initially retracted as shown in FIG. 14 when the good spindle indexes into the load position. When the command is received from the PLC, earlier disclosed, to lift the stack of compact discs 12 into position for pickup of the topmost disc by the loading mechanism, the screw 590 is caused to rotate in a counter-clockwise direction. The friction between the threaded member or nut 578 and the screw 590 is used to drive the fork member 544 into position under the bobbin (FIG. 9). Once the fork member has been fully extended under the bobbin 488, as shown in FIG. 10, the rotation of the screw 590 in the nut starts to lift the fork carriage assembly and stack of compact discs. This is made possible because the threaded member is prevented from further counter-clockwise rotation by the stop 588. When the top most disc 12 reaches the predefined send position, i.e., it is sensed by the optical fiber sensor 700, the fork carriage assembly will stop and hold its position until the top most disc 12 has been removed from the stack of discs by the loading mechanism hereinafter further described. The elevator send speed can vary somewhat as desired. This will, in general, depend primarily upon the output of printed compact discs desired, or speed at which the apparatus can operate, as will be readily appreciated by those skilled in the art, as well as upon the dwell time of the elevator desired at the send position. The elevator speed in the practice of the invention as disclosed herein has been optimally set at about 90 rpm, i.e., the screw 590 rotates at that speed. In this case, when the top most disc 12 reaches the send position, the fork carriage assembly will stop and hold its position at that elevation until the disc has been removed for a duration of about 0.25 seconds.

If the optical fiber sensor 700 does not detect a disc 12 on the spindle 484, the elevator mechanism will continue its upward travel until a second optical sensor (not shown) is reached, indicating to the fork carriage assembly that it has reached the predetermined top of its upward travel. This top of travel sensor is located above the sensor 700 and inside the housing at the top thereof (not shown). Various sensors can be used for this purpose provided such can function to detect the predetermined extent of upward travel by the spindle, e.g., by detecting the edge of the bobbin, or some portion on the fork carriage assembly, as desired. The optical sensor used in the practice of the invention for detecting the top of travel of the elevator mechanism is like that earlier disclosed. The providing of such a sensor is critical in the practice of the invention so that the fork carriage assembly stops and reverses its direction of travel.

When the top of travel of the stacking means in the load position is sensed, the screw 590 is caused to reverse its direction of rotation by the stepping motor 600. The elevator mechanism then returns to its home position at an optimal rate of about 450 rpm. This location is defined by a conventional optical sensor, like that earlier disclosed. This optical sensor (not shown) is located just inside the housing for the elevator mechanism in a suitable position, readily determined by those skilled in the art to importantly detect the down and home position of the fork carriage assembly, i.e., the fork member is retracted, as shown in FIG. 14. The screw 590 on reaching the down position nevertheless continues its rotation causing the nut to rotate in clockwise fashion and in so doing to retract the fork member 544 from its location under the now empty spindle to its home position.

When the fork member is in its fully retracted location (FIG. 14), the empty spindle then indexes clockwise to the next adjacent location. The spindle in the preload location at the same time indexes to the load location. If the spindle from the preload position is a good spindle the cycle repeats, i.e., the fork carriage assembly is raised to the predetermined send location, and the topmost compact disc in the stack is picked up by the loading mechanism, as before-described.

If during the course of feeding compact discs, the feed apparatus is removed from the systems "cycle mode," the system will "remember" that compact discs are still present on the spindle at the load position of the feed apparatus. This assumes that there were compact discs on the spindle waiting to be sent to the loading mechanism at the time of removal of the feed apparatus from the operating cycle. When the feed apparatus is returned to the system's cycle mode, the fork carriage assembly will immediately attempt to feed compact discs once again from the spindle located at the send location without first requesting a table index. This memory will be cleared, however, when a manual index is performed, the stack reset sensor is tripped, or there is a power loss.

As the fork carriage assembly is being raised whereby the top-most compact disc can be detected, the loading-/unloading apparatus 16 and rotable support member 14 is placed in synchronous operation with the disc sender apparatus 18. Thus, an empty sucker arm on the loading mechanism is caused to rotate horizontally in clockwise fashion, stopping in the predetermined precise location in the horizontal plane described vertically above the spindle having a stack of compact discs 12 in the load position. The unloading apparatus 20 is placed at the same time in the operating cycle. Also, when the system cycle button is pushed, the transport member 14 is caused to rotate in clockwise manner, automatically indexing at each third position, as later more fully described. Any final adjustments in the location of the feeding and receiving apparatus relative to the loading-/un-loading apparatus is made at this time.

The horizontal rotation of the loading mechanism is stopped, placing a sucker directly above the stack of discs in the load position on the feed apparatus. The arm 278 on the loading mechanism 336 of the loading/unloading apparatus is then caused to pivot downwardly at its outer end and the loading mechanism 336 drops vertically downwardly a predetermined distance putting the sucker cup in position for picking up the top most compact disc 12 in the stack. The arm 278 is then caused to pivot back to the horizontal causing the loading mechanism to be raised the desired predetermined height to clear the spindle on being rotated in that horizontal plane. The pick and carry unit then rotates in that horizontal plane transferring the top-most compact disc 12 from the stack of discs to the predetermined point vertically above the disc fixture 108 located at position No. 1 on the transport member. The arm 278 on the loading/unloading apparatus again pivots downwardly, as before, dropping the loading mechanism vertically downwardly to the predetermined point just above the disc fixture. It will be appreciated that at the same time the next sucker counter-clockwise is caused to be lowered, as before described just above the stack of compact discs at the load position. The suction to that sucker arm located above the disc fixture is closed off and vented off through the valve stem. This results from the valve stem on the valve in the sucker arm at that location being depressed as the loading mechanism drops downwardly. See FIG. 15. Thus, the compact disc 12 being held by that sucker is no longer being held by that sucker and drops onto, and into the well 146, of the disc fixture. The centering pin 196, at the same time, is caused to raise vertically upwardly, centering the compact disc 12 just transferred into the disc fixture, so as to be properly registered in the fixture well prior to being printed. Suction is applied to the compact disc 12 just centered holding it firmly in the centered position in the fixture as the compact disc 12 is transported by the rotatable transport member 14 through the various work stations e.g. printing, curing, etc., as desired, prior to being off-loaded from the transport member. At the time that suction is applied to the compact disc being transported from location No. 1, the centering pin is caused to retract so that its top is located below the horizontal plane defined by the compact disc and top surface of the disc fixture. It is important, however, that the centering pin is not withdrawn prior to application of vacuum to the disc. As earlier disclosed, sensing means can be provided to determine whether a disc is actually being loaded. If not, the vacuum to that disc fixture is not activated. This sensor can be an optical fiber sensor as before disclosed.

At the same time that the compact disc 12 is dropped onto the disc fixture 108 on the transport apparatus 14, the sucker arm located next adjacent and counterclockwise to that sucker arm from which the compact disc has just been dropped onto the disc fixture picks up the top-most compact disc from the stack of discs at the load station on the feeder apparatus, i.e., m the second disc vertically downwardly in the original stack of discs, as before described and transfers it to the loading point on the rotatable transport member 14 at location #1 as the pick and carry unit rotates in clockwise manner, to be loaded onto the next adjacent disc fixture indexed into that location. As there will be two empty disc fixtures initially, until completion of three rotations, due to the indexing of each third location, these two locations can, if desired, be loaded by hand prior to activation of the printing system. The next adjacent sucker arm counterclockwise, i.e., the third sucker arm on the loading mechanism, is then rotated into position at the same time over the stack of compact discs at the load position on the feed apparatus. The arm 278 pivots downwardly as before and the now top-most compact disc 12, i.e., the third disc down in the original stack of discs, is picked up. The second compact disc transferred from the stack of discs is then loaded at the same time, i.e., allowed to drop off the suction arm onto the compact disc fixture, centered, and suction applied thereto as before described. The rotatable transport member meanwhile has indexed to location No. 4 in its circular path of travel. The arm 278 on the loading/unloading apparatus pivots downwardly again as earlier disclosed, the third disc in the stack, now the top-most disc, is picked up by the sucker on the sucker arm. The arm 278 is caused to pivot back to the horizontal and the compact disc just picked off the stack is transferred to the loading point at station No. 1 on the transport member as the loading mechanism rotates in the horizontal plane, as before described. The disc is then loaded (dropped off) onto the third disc fixture indexed into that location, centered, and vacuum applied thereto. The indexer 32 meanwhile causes the dial or transport member to rotate in clockwise manner, causing the fixture with the first loaded compact disc located therein to pass stations Nos. 2 and 3, the disc fixture indexing at station No. 4. The second compact disc follows the same pattern of travel as the first disc, i.e., it indexes past stations 2 and 3, indexing at station 4. The dial continues rotating clockwise with the first disc passing stations Nos. 5, 6, and indexing at station No. 7, whereat the first-loaded compact disc 12 is printed with the first color. The dial then continues rotation in a clockwise manner, the first disc passing stations Nos. 8, 9, indexing at station No. 10. Disc No. 2, meanwhile has passed stations Nos. 5, 6, stopping at station No. 7, to be printed with the first color. The first compact disc meanwhile has been indexed passed station No. 15 whereat the first ink applied is partially cured by conventional UV-Curing Apparatus. One type of such apparatus which will be found suitable and has provided good results in the practice of the invention is manufactured and sold by Fusion Systems Corporation, Rockville, Md., under the trade designation Model F300. It will be appreciated by those skilled in the art, however, that any such apparatus is somewhat dependent upon the particular ink being applied.

Thus, rotation of the transport member continues until the first compact disc printed with the first color is indexed beyond the loading station, stopping at station No. 2. The dial continues, indexing each third station, reaching station No. 11 whereat the first compact disc loaded is printed with the second color. The disc applied with the first and second colors does not stop at a location where UV curing apparatus is located. The ink is merely partially cured, on the fly, so-to-speak.

Subsequent to being printed with the second color, the compact disc is ultimately indexed to station No. 3 whereat the disc is printed with the third color, and afterwards fully cured as before described. In some instances, the ink may only be partially cured at station No. 15. If such is the case, the ink on the compact disc when indexed to station No. 18 is further cured.

Afterwards, the triple printed first loaded compact disc indexes to station No. 21 whereat it is off-loaded from the annular-shaped rotable member by the unloading apparatus and placed on a spindle located at the unloading position, to start building a stack of compact discs. Thus, all of the compact discs from the stack are loaded onto the dial, printed, cured, off-loaded from the dial and provided in a stack of horizontally disposed printed discs, superposed one above the other.

When the last compact disc is transferred from that first spindle at the loading station, the compact disc sensor 700 senses that there are no more compact discs on that spindle. As a result, the spindle indexing table rotates in clockwise manner causing the empty spindle to be moved out of the loading position and the next adjacent spindle counterclockwise loaded with a stack of compact discs to move the preloading position to the loading position. Once there, the cycle just described continues, i.e., the elevator mechanism raises the stack of discs to the sending height, the top disc in that stack is then removed, loaded onto the dial, indexed and printed, cured, and off-loaded, as before described. This procedure continues until all the compact discs in the stack on that spindle have been printed and off-loaded and again provided in a stack of printed discs on an empty spindle located at the unloading station. The action continues until all the compact discs which are to be printed have been printed and once again provided in a plurality of stacks.

When an empty stacking means is indexed past the loading station on the feed means that stacking means can then be replaced with a stacking means that has been provided with a new stack of discs. Meanwhile, any empty spindles can be loaded with a stack of compact discs for loading onto the indexing table, as needed. This action continues until the desired number of discs have been printed.

In the case of the unloading apparatus, when the stack of discs in the unload position is completed, that stacking means then indexes past the unloading station to the next station clockwise whereat it can be removed from the indexing table and replaced with an empty stacking means. At the same time, a good stacking means in the pre-unload position is indexed into the unload position. The receiving apparatus functions similar to that described earlier with respect to the feed apparatus, i.e., it has two sensors that monitor for the presence of a good spindle and bobbin. Nevertheless, the receiver module has no elevator mechanism or other moving parts at the unload(load) station and therefore its operation is much simpler. If a good spindle has been indexed into the unload position, the receiver is ready to receive discs. This will be true until the predetermined number of discs have been received on the spindle or until the spindle full sensor is tripped. When the spindle is determined to be full, the receiver will request an index and the cycle will continue.

The control unit 106, as earlier-mentioned, can be provided with various activating buttons, control knobs, or the like for performing of various functions, as desired, e.g. start/stop of the systems, indexing of the various indexers provided, operation or deactivation of the loading/off-loading apparatus, etc. This unit will contain various control circuitry interfacing with the PLC. The various inputs/outputs provided in the PLC will be determined by a predetermined decision tree that determines the operation of the various components comprising the system and their synchronization. All of this is within the skill of those in the art knowing what functions are to be preformed and when.

Although not shown in the drawings, sensing means such as a conventional capacitance sensor can be provided in association with the silk-screen printers and the annular transport member. The purpose of such a sensor is to determine the presence of a compact disc in a disc fixture, both before and after printing, to make certain that a compact disc has not been held onto by the printer screen. Such a sensor can be mounted so as to look down onto the disc fixture both before and after the printer station.

As understood by those skilled in the art, various modifications and changes can be made in the invention and its form and construction without departing from the spirit and scope thereof. The embodiments of the invention disclosed herein are merely exemplary of the various modifications that the invention can take and the preferred practice thereof. It is not, however, desired to confine the invention to the exact construction and features shown and described herein, but it is desired to include all such as properly come within the spirit and scope of the invention disclosed and claimed.

We claim:

1. Apparatus means for the silk-screen printing of a top surface of each of a plurality of compact discs one-at-a-time in a predetermined time sequence, each compact disc being defined by top and bottom planar surfaces, the bottom surface being recorded information, and by a center hole of a predetermined inner radius and an outer radius defining the outer peripheral edge of the compact disc comprising in combination:

(a) a horizontally disposed annular-shaped member rotatable about a first center point and being defined by predetermined inner and outer radii and having top and bottom planar parallel surfaces for transport of a plurality of compact discs in equal predetermined radial spaced-apart locations on the top surface of the rotatable member in a circular-defined path to and through at least one work station from a loading position to an off-loading position;

(b) a compact disc fixture being provided on the top planar surface of said annular-shaped rotatable member at each of the predetermined spaced-apart locations for such compact discs, each disc fixture being defined by top and bottom planar parallel spaced-apart surfaces, a horizontally disposed circular-shaped well being defined by a second center point and a predetermined radius and a vertically disposed outer circular-shaped peripheral surface having its top edge terminating in the top planar surface of the disc fixture and its bottom edge in a horizontally disposed annular-shaped bottom planar surface defined by predetermined inner and outer radii, said outer radii being the same as that radius of the well at its top, an inner circular-shaped peripheral surface being determined by the inner said radii of the well bottom surface and extending vertically upwardly from the bottom surface and terminating in a horizontal plane a predetermined vertical distance below that of the top planar surface of the disc fixture, an annular-shaped horizontally disposed surface extending inwardly from the inner peripheral surface and terminating at a predetermined inner radius defining the top of a vertically disposed downwardly extending circular-shaped opening, an annular-shaped disc support member being defined by top and bottom planar surfaces, an outer radius just short of that of the well outer radius and an inner radius just slightly greater than that of the inner radius of the well whereby said disc support member will reside in the well with its annular-shaped bottom surface in contact with the annular-shaped bottom surface of the well and its top surface will lie in the same horizontal plane as that defined by said inwardly extending horizontally disposed surface so that when a compact disc is located in the disc fixture its top planar surface will lie in the same horizontal plane as that of the top surface of the disc fixture; and (c) means operatively associated with each of the compact disc fixtures and being located below the bottom surface of the annular-shaped rotatable member in opposition to said fixture for providing precise registration of each compact disc in the disc fixture prior to the silk-screen printing of the top surface thereof, said means comprising an elongated vertically disposed circular-shaped housing being located in direct opposition to and being concentric with said vertically disposed downwardly extending circular-shaped opening in said well, an elongated circular-shaped registration pin being provided in said housing and being of a diameter so as to be freely movable vertically upwardly and downwardly therein, and an actuating means for causing the elongated registration pin to be moved vertically upwardly to intrude into the center hole of a compact disc as it is being loaded onto the disc fixture for precise registration of the compact disc for subsequent screen printing thereof, and means for retracting the registration pin to a predetermined point below the top surface of the disc fixture following the disc registration.

2. Apparatus means according to claim 1 further comprising means operatively associated with said transport member for providing vacuum independently to each said compact disc fixture for holding of each of said compact disc on said rotatable annular-shaped member in the same precise location in the disc fixture after being registered therein while the disc is being transported from said loading position to said off-loading position in said circular-defined path; and means is provided for causing vacuum to be connected to said disc fixture at the same time the registration pin is being retracted from the disc center hole.

3. Process for the screen printing of a plurality of compact discs each being defined by a center hole defined by an inner periphery of a predetermined inner radius and an outer periphery of a predetermined outer radius and by top and bottom parallel planar surfaces, said bottom surface of the compact disc being characterized by recorded information thereon comprising the following steps:

(a) providing a rotatable transport member defined by a horizontally disposed planar top surface for supporting the plurality of compact discs in predetermined spaced apart locations on the top surface while such are being transported on the transport member to and from at least one screen printing station between a loading and off-loading station;

(b) loading of said plurality of compact discs one-at-a-time onto the top surface of the transport member whereby the compact discs are provided at a predetermined spaced-apart locations on the top surface of the transport member, the compact discs each being loaded onto the transport member so that the bottom surface thereof is provided in horizontal disposition and directly adjacent the top surface of the transport member;

(c) causing each compact disc to be precisely registered in a predetermined location relative to the top surface of the transport member as the compact disc is being loaded onto the transport member;

(d) applying vacuum to the bottom surface of the registered compact disc to maintain the disc in its predetermined registered location on the transport member;

(e) transporting the compact discs to and through said at least one screen printing station from said loading to said off-loading station whereby the top surface of the disc is printed; and (f) closing off the vacuum to each compact disc at the off-loading station whereby the printed disc can be off-loaded from the transport member.

4. Process for screen printing according to claim 3 wherein prior to being loaded onto the rotatable transport member, a compact disc is held in a horizontally disposed manner and is centered with respect to the location on the top surface at which it is to be loaded onto the transport member.

5. Process for screen printing according to claim 3 wherein the loading stop comprises first centering a compact disc over a predetermined location on the transport member for the disc while the disc is being held in horizontally disposed manner, and allowing the centered disc to drop vertically downwardly to the transport member.

6. Process for screen printing according to claim 5 wherein, as the disc is being dropped vertically downwardly, an elongated vertically disposed registration pin is caused to be raised vertically upwardly in such a manner that the top end of the registration pin intrudes into the center hole provided in the compact disc and the compact disc is precisely registered at its predetermined location for later screen printing, and the vertically raised registration pin is caused to be retracted.

7. Process for screen printing according to claim 6 wherein just prior to causing the registration pin to be retracted vacuum is applied to the bottom surface of the compact disc for holding the disc in its precisely registered location for transport.

8. System for the automatic screen printing of information on a horizontally disposed top planar surface of a compact disc such surface being the surface opposite from that on which recording is provided comprising in combination:

(a) an annular-shaped, fixed body member defined by a planar, horizontally disposed, top surface and by predetermined inner and outer radii extending from a center point, said body member being further defined by a first planar, annular-shaped bottom surface parallel to said top surface and having an outer radius less than the outer radius of the top surface and a second, planar, annular-shaped bottom surface parallel to the top surface and being located between said first bottom surface and the top surface of the fixed body member, said second bottom surface being defined by predetermined inner and outer radii, the outer radius being less than that of said top surface but greater than that of said first bottom surface and a vertically disposed peripheral surface connecting the said second bottom surface at its inner radius to the first bottom surface at its outer radius whereby an annular-shaped overhang surface is provided defined by the second bottom surface and the vertically disposed peripheral surface, and an opening being provided in the fixed body member for communication with a vacuum source;

(b) an annular-shaped rotatable transport member for transporting a plurality of compact discs in predetermined spaced-apart locations in a predetermined circular defined path from a loading point to an off-loading point for the compact discs, said transport member being located in a plane below the fixed body member and being defined by horizontally disposed planar top and bottom surfaces and being of predetermined outer and inner radii extending from a center point in the same vertical axis as the center point of the fixed body member and terminating in vertically disposed outer and inner peripheral edges, the outer radius of said transport member being a predetermined length greater than the outer radius of the fixing body member;

(c) a plurality of silk-screen printers being mounted to the fixed body member and being operatively associated with the top surface of said annular-shaped rotatable member in predetermined spaced-apart radial fixed dispositions with respect to one another and the annular-shaped fixed body member, each said printer comprising a squeegee facing outwardly from the center point of the fixed body member and being moveable inwardly and outwardly in a direction along a radius of the transport member, and a horizontally disposed silk-screen frame having a screen therein, said squeegee and screen being in operative combination with one another, said silk-screen frame facing outwardly from the center point of the annular-shaped transport member and overlying the top surface thereof inwardly from said outer peripheral edge whereby the squeegee will be caused to move in radial fashion inwardly a predetermined distance toward the center point of the transport member and across the top planar surface of each compact disc to be printed during the printing cycle and then outwardly to its initial position;

(d) a plurality of disc fixtures each for holding one of said plurality of compact discs, said fixtures being located in spaced-apart predetermined radial locations on the top surface of the rotatable transport member, each of said disc fixture being defined by top and bottom planar surfaces and being in parallel disposition to one another and to the top horizontally disposed planar surface of the rotatable transport member, the bottom surface of the fixture being supported by and in contact with the rotatable member top surface, a circular-shaped well being provided in the top surface of the disc feature defined by a planar horizontally disposed annular-shaped bottom surface parallel to the fixture top surface and being of predetermined inner and outer radii extending from the center point of the circular-shaped well, an outer circular-shaped peripheral edge extending vertically upwardly from the bottom surface of the well at the outer circumference defined by its outer radius and terminating at the top surface of the disc fixture, the compact disc fixture being further defined by a circular-shaped well provided in, and extending inwardly from the bottom surface of the fixture, said bottom well being defined by a bottom annular-shaped horizontally disposed planar surface and by inner and outer radii the same as the inner and outer radii defining the bottom surface of the well provided in the top surface of the disc fixture, the bottom surfaces of the two wells being parallel to one another and defining a horizontally disposed annular-shaped bridge separating the two wells, and a plurality of spaced-apart openings being provided in the bridge for communication between the two wells, and an opening being provided in the said rotatable member at each disc fixture location extending from the bottom surface to said top surface of the rotatable member and being in communication with the bottom surface, and a vacuum conduit being connected to the opening at the bottom surface of the rotatable member;

(e) vacuum means comprising an annular-shaped vacuum manifold defined by top and bottom planar surfaces parallel to one another, and by predetermined outer and inner radii defining outer and inner peripheries, and by a vertically disposed inner peripheral edge connecting the said top and bottom surfaces at their inner peripheries, said inner radius being only slightly greater than the outer radius of the first bottom surface whereby the inner peripheral edge of the vacuum manifold is in abutting sliding contact with the vertically disposed peripheral surface of the fixed body member, an annular-shaped groove being provided in, and extending inwardly from, the top surface of the vacuum manifold, said groove being in communication with said opening provided in the fixed body member for communication with said vacuum source, the top surface of the manifold being in sliding contact with said overhang surface and a plurality of conduits being provided between and interconnecting the vacuum manifold to each of the vacuum conduits connected to the bottom surface of the rotatable member for providing vacuum to each said fixture and to the bottom surface of a compact disc located therein;

(f) a plurality of means operatively associated with each of said plurality of disc fixtures being located on the bottom surface of the rotatable transport member for precisely registering of each compact disc being loaded onto the transport member; and (g) means being provided in each said vacuum conduit for allowing vacuum to be applied to each said fixture at the time that a compact disc is being registered in the disc fixture and for closing off said vacuum after the disc is printed and just prior to being off-loaded.

\* \* \* \* \*

UNITED STATES PATENT AND TRADEMARK OFFICE
CERTIFICATE OF CORRECTION

PATENT NO. : 5,335,594
DATED : August 9, 1994
INVENTOR(S) : William M. Karlyn et al It is certified that error appears in the above-indentified patent and that said Letters Patent is hereby corrected as shown below:

Column 24, line 9 -i.e.,- should be inserted following the word "asymmetrical."

Column 29, line 21, reference numeral "68" should read -668-.

Column 38, line 38, the letter "m" should not appear before the word "the," second occurrence.

Claims
Column 43, line 4, the word "stop" in claim 5 should read -step-.

Column 43, line 66, claim 8, the word "fixing" should read -fixed-.

Column 44, line 33, claim 8, the word "feature" should read -fixture-.

Signed and Sealed this

Thirteenth Day of December, 1994

BRUCE LEHMAN

Attest:

Attesting Officer

Commissioner of Patents and Trademarks